US012619341B2

(12) United States Patent
Olbrich et al.

(10) Patent No.: US 12,619,341 B2
(45) Date of Patent: May 5, 2026

(54) DYNAMIC COLLECTION-BASED CONTENT PRESENTATION

(71) Applicant: Amazon Technologies, Inc., Reno, NV (US)

(72) Inventors: Keila Kristine Olbrich, Seattle, WA (US); Bolun Yang, Bothell, WA (US); Anastasia Marie Lake, Seattle, WA (US); Joey S. Cheng, Seattle, WA (US); Frank Marino, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 392 days.

(21) Appl. No.: 16/950,050

(22) Filed: Nov. 17, 2020

(65) Prior Publication Data

US 2022/0155940 A1     May 19, 2022

(51) Int. Cl.
*G06F 3/00* (2006.01)
*G06F 3/04842* (2022.01)

(52) U.S. Cl.
CPC .............................. *G06F 3/04842* (2013.01)

(58) Field of Classification Search
CPC ................................................. G06F 3/04842
See application file for complete search history.

(56) References Cited

U.S. PATENT DOCUMENTS

| | | | |
|---|---|---|---|
| 7,930,419 B2 * | 4/2011 | Mullig .................. | H04L 65/612 709/231 |
| 8,977,721 B2 * | 3/2015 | Goodwin ............ | G06F 16/9577 709/219 |

| | | | |
|---|---|---|---|
| 9,532,111 B1 * | 12/2016 | Christie .............. | G06F 3/04886 |
| 10,175,849 B2 * | 1/2019 | Yamanaka ............ | G06F 3/0481 |
| 10,203,847 B1 | 2/2019 | Haitani et al. | |
| 10,380,226 B1 * | 8/2019 | Tseng ...................... | G06F 40/10 |
| 10,706,450 B1 | 7/2020 | Tavernier | |
| 2007/0100799 A1 | 5/2007 | Rose et al. | |
| 2009/0313550 A1 * | 12/2009 | Kim ...................... | G06F 16/954 715/744 |
| 2010/0199219 A1 * | 8/2010 | Poniatowski ...... | H04N 21/4828 715/825 |
| 2010/0333025 A1 * | 12/2010 | Roberts .............. | G06F 16/7844 715/823 |

(Continued)

OTHER PUBLICATIONS

International Search Report and Written Opinion issued in PCT Application No. PCT/US2021/059439 dated Mar. 14, 2022.

*Primary Examiner* — Jessica S Manno
*Assistant Examiner* — Andrew Chung
(74) *Attorney, Agent, or Firm* — Hogan Lovells US LLP

(57)     ABSTRACT

User interactions may be used to recognize a user's intent and provide a dynamic ingress bar (DIB) that carries forward relevant search information for the user. User interactions provide hints for the DIB to populate a collections area including items that have a common theme with the hint. The DIB is provided along with the user's selection so that the user can quickly recognize how their selection is associated with the collection and also continue navigating through a site without backtracking. As the user interacts with additional content, a new user intent may be determined to update the hint and repopulate the collections area based on the updated hint.

20 Claims, 17 Drawing Sheets

(56)            References Cited

U.S. PATENT DOCUMENTS

| | | | |
|---|---|---|---|
| 2011/0179453 A1* | 7/2011 | Poniatowski ...... | H04N 21/4622 |
| | | | 725/58 |
| 2011/0289458 A1* | 11/2011 | Yu ...................... | H04N 21/4312 |
| | | | 715/810 |
| 2012/0042282 A1* | 2/2012 | Wong ................... | G06F 16/904 |
| | | | 715/811 |
| 2013/0212493 A1* | 8/2013 | Krishnamurthy ..... | H04L 65/403 |
| | | | 715/753 |
| 2013/0332830 A1* | 12/2013 | Ciurdar .............. | H04N 21/8133 |
| | | | 715/719 |
| 2014/0058840 A1* | 2/2014 | Chakrabarty ......... | G06F 16/951 |
| | | | 715/777 |
| 2014/0223464 A1* | 8/2014 | Moran ............. | H04N 21/44222 |
| | | | 725/12 |
| 2014/0372913 A1* | 12/2014 | Roth ................... | G06F 3/04817 |
| | | | 715/760 |
| 2016/0019221 A1* | 1/2016 | Knoll ................... | H04L 67/306 |
| | | | 715/202 |
| 2016/0180389 A1 | 6/2016 | Kotas | |
| 2016/0188143 A1* | 6/2016 | Kohlmeier ........... | G06F 3/0482 |
| | | | 715/753 |
| 2017/0094360 A1* | 3/2017 | Keighran ............ | G06F 3/04883 |
| 2017/0115835 A1* | 4/2017 | Nishiyama .......... | G06F 3/04886 |
| 2018/0130097 A1* | 5/2018 | Tran ................... | G06Q 30/0267 |
| 2019/0034541 A1* | 1/2019 | Bosarge ............ | G06F 16/90324 |
| 2020/0304879 A1* | 9/2020 | Ellingford ............ | G06F 3/0482 |
| 2021/0208744 A1* | 7/2021 | Wood ...................... | H04L 29/06 |

* cited by examiner 302 304 308 306 312 308 202

300 310 314

302 304 308 306 312 308 202

300 310 316 316 314

400

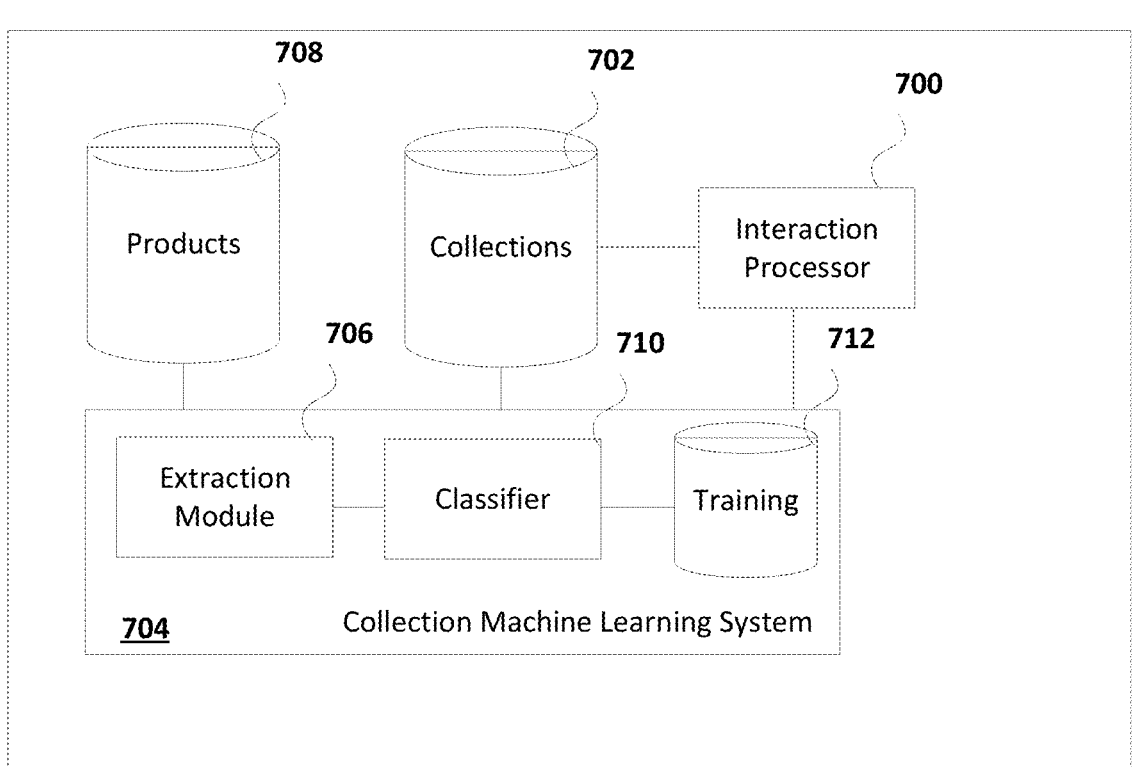
FIG. 7

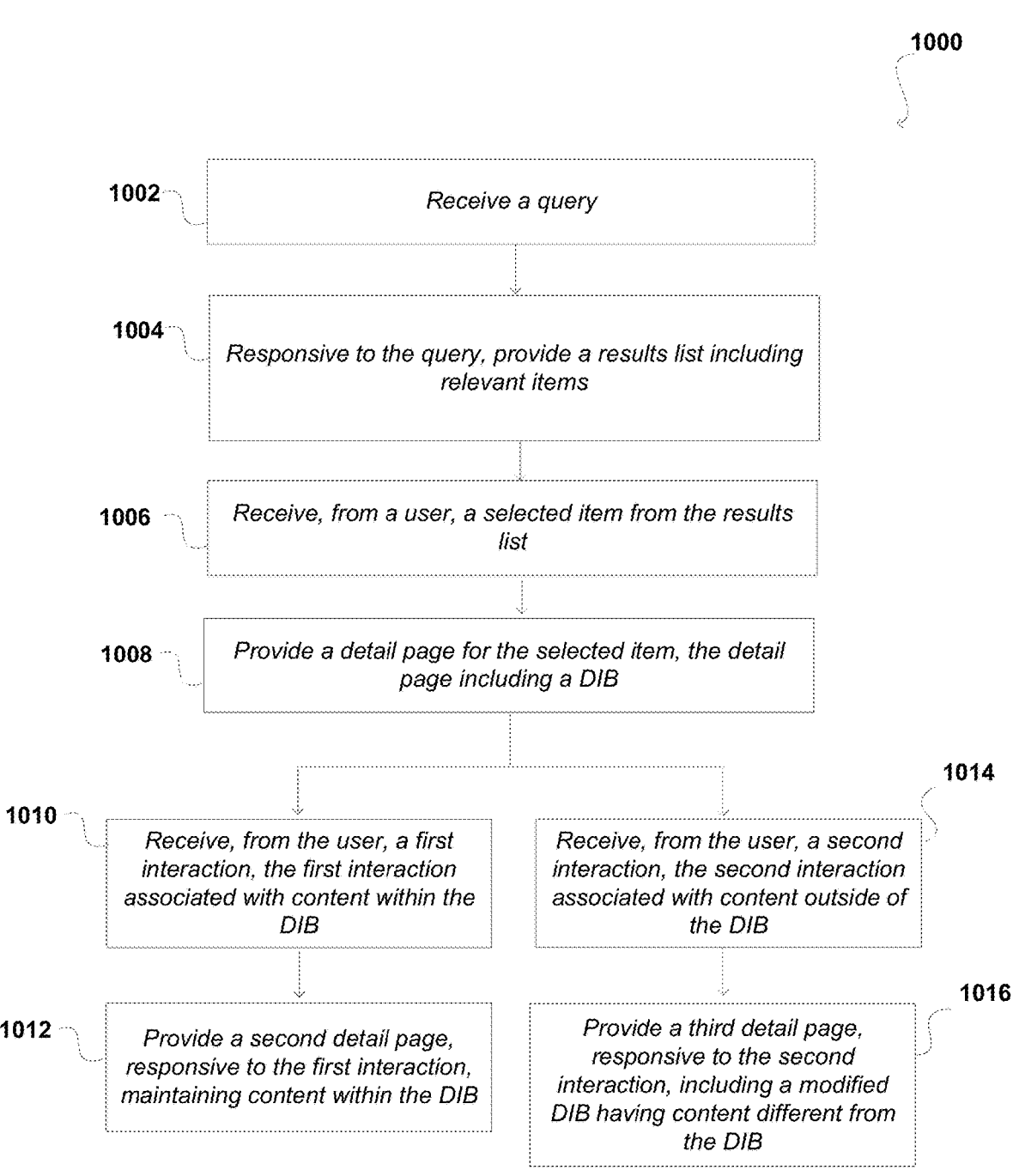

1000

1002    Receive a query

1004    Responsive to the query, provide a results list including relevant items 1006    Receive, from a user, a selected item from the results list 1008    Provide a detail page for the selected item, the detail page including a DIB 1010    Receive, from the user, a first interaction, the first interaction associated with content within the DIB 1014    Receive, from the user, a second interaction, the second interaction associated with content outside of the DIB 1012    Provide a second detail page, responsive to the first interaction, maintaining content within the DIB 1016    Provide a third detail page, responsive to the second interaction, including a modified DIB having content different from the DIB

FIG. 10

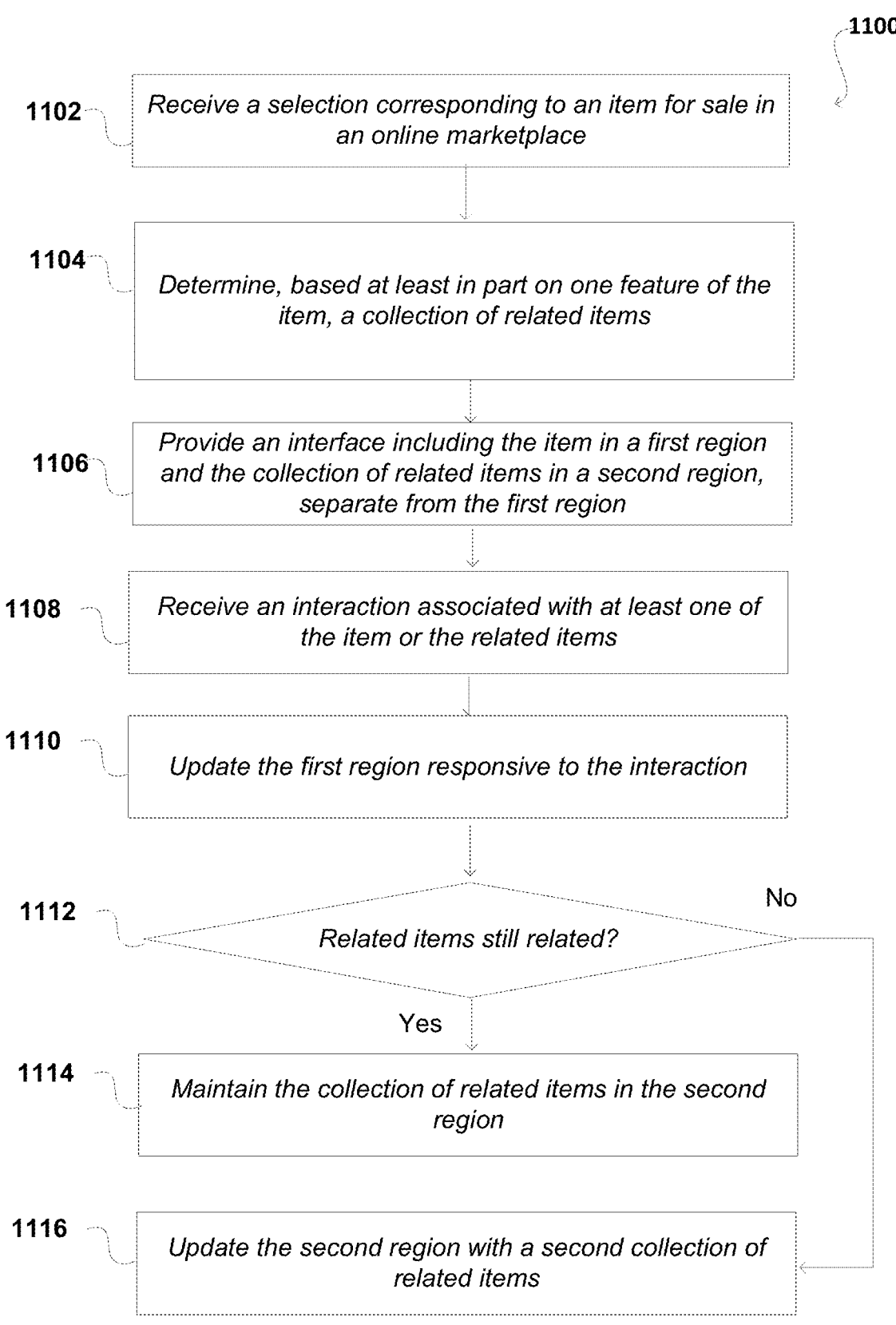

1100

1102 — Receive a selection corresponding to an item for sale in an online marketplace 1104 — Determine, based at least in part on one feature of the item, a collection of related items 1106 — Provide an interface including the item in a first region and the collection of related items in a second region, separate from the first region 1108 — Receive an interaction associated with at least one of the item or the related items 1110 — Update the first region responsive to the interaction 1112 — Related items still related?     No Yes 1114 — Maintain the collection of related items in the second region 1116 — Update the second region with a second collection of related items

DYNAMIC COLLECTION-BASED CONTENT PRESENTATION

BACKGROUND

As computing technology continues to advance, an increasing amount of data is being processed and stored electronically. In order to locate content of interest to a user, the user typically will enter a search query that will cause a set of search results to be provided that are relevant in some way to the search query. The user may then select one of the results to be directed toward a detail page that provides more information to the user for the selected result. As the amount of content increases, it becomes ever more difficult to provide content to users in an appealing way to reduce navigational responsibility for the user.

BRIEF DESCRIPTION OF THE DRAWINGS

Various embodiments in accordance with the present disclosure will be described with reference to the drawings, in which:

FIG. 7 illustrates an example content provider environment that can be utilized to implement aspects in accordance with various embodiments.

FIG. 10 illustrates an example process for updating an interface that can be utilized in accordance with various embodiments.

FIG. 11 illustrates an example process for updating an interface that can be utilized in accordance with various embodiments.

DETAILED DESCRIPTION

Figure 1A:
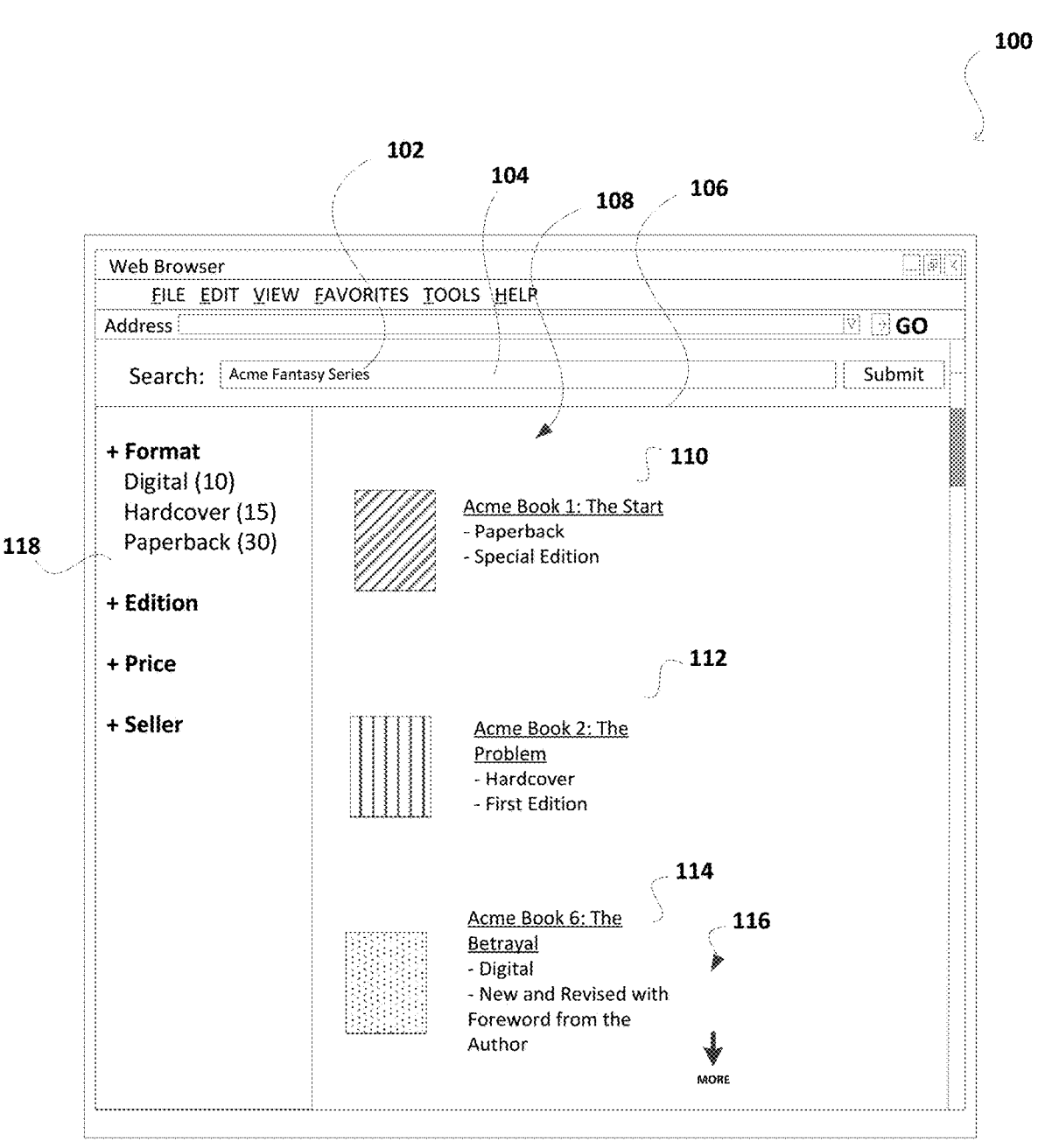
FIGS. 1A and 1B illustrate example interfaces that can be provided for display in accordance with various embodiments.

Approaches in accordance with various embodiments provide for content presentation using a dynamic, collection-based approach. In particular, a dynamic ingress bar (DIB) may provide users with content related to a selection from a search query, where the content illustrates related items grouped based on associated collections. As a user continues to navigate through various pages, the content presented within the DIB may be dynamically updated based on the user's selections, which may provide information regarding the user's intent to update the items within the collection or the collection itself. Such an approach reduces cognitive load on a user, as related items are pulled forward with the user as the user continues to search and navigate throughout the site. Additionally, the DIB may organize information within a common window that allows the user to quickly and easily identify items within a similar collection or grouping. Furthermore, the DIB may provide an interface that enables additional content presentation on the screen and also simplifies the presentation for use on mobile devices or devices where it may be difficult to view content.

In various embodiments, a user's selection from a search query (e.g., an internal search query within an online marketplace, an external search query directed toward an online marketplace, etc.) may be utilized to populate content within the DIB. The DIB may include various regions or zones for content, where the initial selection may serve as a "hook" or "driver" to subsequent content. A collections zone may include items that are related to the hook or driver. By way of example, the collections may include items within a similar series, such as with books, movies, video games, and the like. Additionally, collections may correspond to similar authors, designers, developers, directors, actors, and the like for other types of content. Accordingly, the user may be presented with information about their original selection along with other information that provides additional context to the original selection and/or provide additional links for navigation to related items.

In certain embodiments, information presented within the DIB may be personalized for the user based on a user profile or information that the user has authorized a provider to access. For example, a user's shopping preferences may be identified such that the collections are reformatted or otherwise centered around those preferences. As an example, if the user typically purchases electronic versions of books, the collections may focus on electronic versions, rather than physical versions. In another example, if a user typically purchases movies, rather than books, collections may include digital downloads of DVDs for items that may have versions shown as both movies and books. Accordingly, user preferences may be utilized to provide a personalized experience to provide information to the user in a compact, direct way to improve the browsing experience.

In various embodiments, the DIB and one or more other areas of a search or detail page may be template based to enable a provider to rapidly populate and adjust items on the page. For example, the DIB may include a hint region, the collections region, and then a supplemental content region. The DIB may also be preferentially arranged at a top of the page to provide quick access to the user while also prioritizing and/or emphasizing certain particularly relevant content for the user. As a result, information may be displayed more rapidly and in a pleasing manner while also enabling different configurations to reduce repetition on the page. This repetition may be related to how the page looks (e.g., changing how regions are displayed with some intervals to provide variety to the user) and/or regarding the content within the regions. As an example, items within the DIB may not be presented at other areas of the page, thereby increasing the amount of content that can be provided over the limited space.

Embodiments of the present disclosure overcome problems associated with cognitive loading for users as they are browsing through a site, thereby providing an improved user experience. For example, by pulling forward results and arranging the results in an organized and intuitive manner, the user may be presented with relevant information in a compact, easily accessible area. Furthermore, the user's may have a navigational compass or anchor to see how their browsing has changed. As an example, the user may notice that content within the DIB has changed, indicating that their browsing has directed them along another path with different collections. Moreover, the DIB may provide a method to manage complexity of the information being provided to the user. By way of example, a book series may include a number of different titles. The DIB may provide these titles in an easily accessible format and provide information to the user to help them make selections, such as indicating which titles are already owned or by updating a display to inform the user whether they are looking at a digital version, paperback, etc. As a result, information may be provided to the user with fewer clicks or interactions, which may be especially important for mobile browsing where screen space is limited and user interaction may be challenging for fine details. Additionally, various embodiments may overcome problems associated with lack of context on detail pages. As an example, a user may click on a movie without knowing that there are more movies in the series. The DIB may provide that information in an accessible format without the user having to scroll through and identify related titles to determine whether the movie is part of a series, and in which order the series may make the most sense. Furthermore, this may also be useful in instances where a series or collection is non-chronological. By way of example, an author may have prepared several different books on slightly different topics. The user may have enjoyed one title and want to see others, even if the books are not necessarily chronological. The DIB may gather and organize these items for the user in a pleasing, easy to accessible format. Furthermore, the DIB may provide additional discovery options for the user. For example, an initial search for a book may lead to a detail page, where the DIB informs the user that the book is part of a series. Moreover, supplemental content may also inform the user that the series has been made into a television series, which may also be available to the user. Accordingly, deeper discovery is provided with fewer user interactions, which may improve the user experience, reduce user input on devices where input may be difficult, and may efficiently present the information on a display.

FIG. 1A illustrates an example search interface 100 that can be generated in accordance with various embodiments. As mentioned, a user may utilize a search query 102 or other such mechanism to attempt to identify or locate content of interest. In this example, a user has entered the search query "Acme Fantasy Series" into a search field 104, which is then used to locate a set of search results 106 that are provided to the user. The terms of the query are utilized to identify instances of content that are determined to be relevant to the provided search query. In this example, each of the search results 106 corresponds to an item determined to be relevant to the user query using one or more search algorithms known in the art. In some embodiments, the search results are ranked by relevance, with the highest ranked items being presented first, or at the top of a search results list 108 or page.

In this example, the results list 108 includes content items 110, 112, 114 that correspond to books associated with the query "Acme Fantasy Series." It should be appreciated that the example of books is for illustrative purposes only and that various other content items may be utilized with embodiments of the present disclosure. By way of non-limiting example, additional content items may include movies, TV shows, music, video games, software programs, clothing, personal items, household items, food, and the like. In this example, each of the content items 110, 112, 114, relates to the Acme Fantasy Series, with the content item 110 corresponding to "Acme Book 1", the content item 112 corresponding to "Acme Book 2" and the content item 114 corresponding to "Acme Book 3." Each of the content items includes a content description 116, which may provide information to the user to assist the user with making a selection of an item. In this example, the content description includes information related to book format and also information regarding an edition of the content item, a price, a delivery date, or the like.

Further illustrated is a filter 118 that may be used by the user in order to narrow or otherwise refine the results list 108. In this example, the books in the results list 108 may include multiple different formats, editions, prices, and sellers, among other options. The filter 118 allows the user to select items corresponding to these particular features in order to decrease the overall number of items presented. While the illustrated search list may provide information associated with the initial query 102, the user searching for the series may still have questions regarding how the information presented fits together (e.g., how are the items linked). For example, the user may not know how many books are in the Acme Fantasy Series based on the results or without additional information, such as scrolling through the results to determine whether there are books after the illustrated Book 6 as content item 114.

Embodiments of the present disclosure may be directed toward identifying collections or otherwise related items responsive to search queries or selections and presenting the information as an interactive, dynamically updating display formatted for presentation on a user interface. As will be described below, a dynamic ingress bar (DIB) may be provided at an area of an interface to clearly provide information to a user, such as at a top region where the user's attention will be quickly drawn to the information. Based on the user's initial query, content portions of the DIB may be populated. As an example, the search query 102 may be analyzed using a variety of methods, such as a natural language processor, to identify information, such as the word "series" to evaluate content items for presentation within the DIB. The DIB in this example may include each book from the Acme Fantasy Series to enable the user to quickly identify each of the items corresponding to the search. From there, the user can continue with navigation through the results list 108 or may navigate through the DIB to identify and select an item of interest.

Figure 1B:
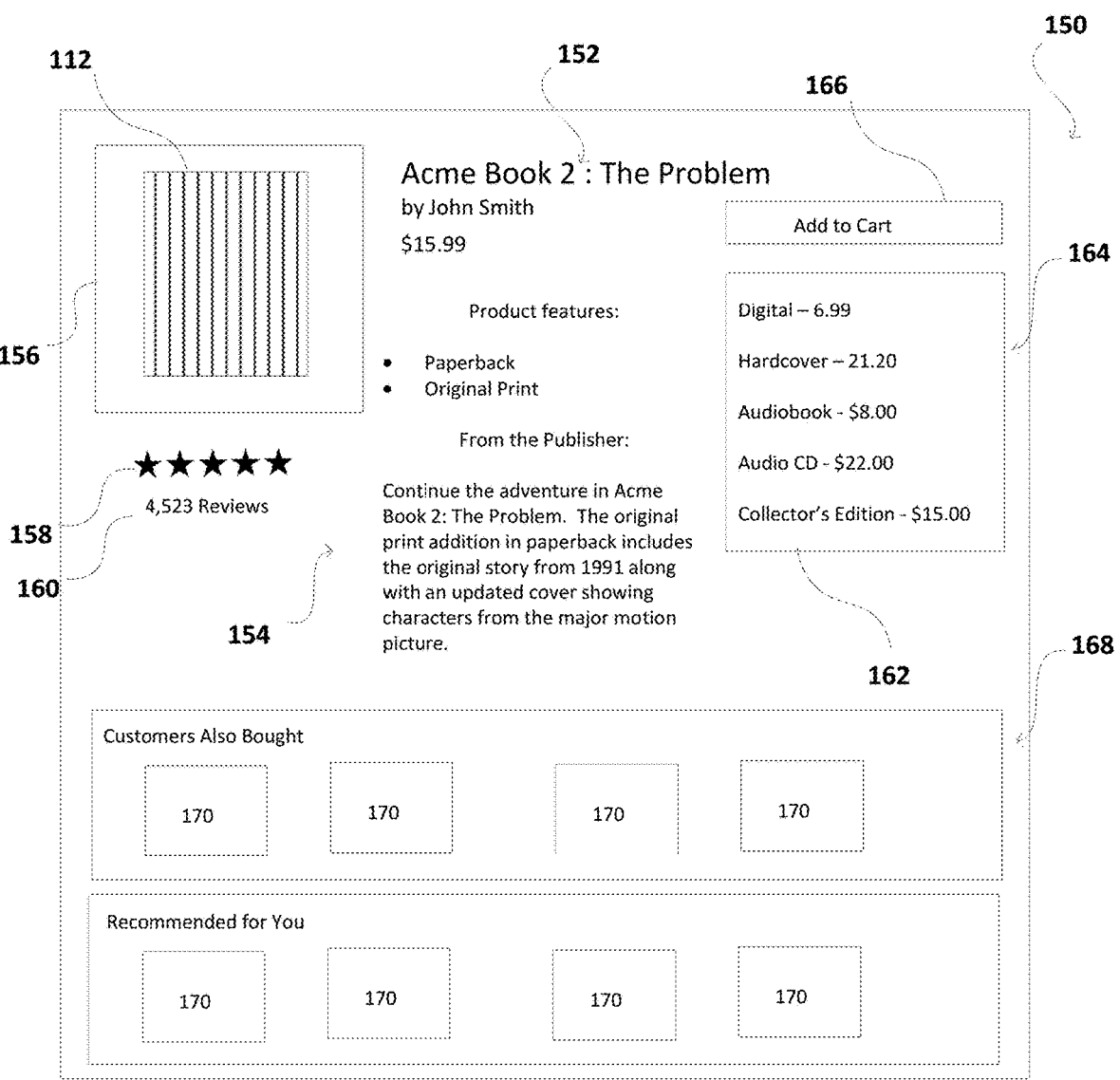

FIG. 1B is illustrates an example detail page 150 responsive to a user selection for the content item 112. The detail page 200 provides additional information to the user and an option to proceed to purchase the item and/or to continue browsing supplemental content or other information related to the content item 112. In this example, a title 152 is provided along with a product description 154, an item image 156, a rating 158, and reviews 160. For example, the title "Acme Book 2: The Problem" is provided along with additional information such as the edition (paperback), the author (John Smith), and the price ($15.99). It should be appreciated that one or more of the portions of the additional information may include an interactive element, such as a link. Additional purchasing options 162 are provided in a separate section that includes links 164 for different editions, such as a digital edition, hardcover, and the like. In various embodiments, the product description 154 will update upon selection of different purchasing options 164. For example, the price may be different if the user selects a different option. The user may proceed to add the item to their cart using an add button 166 and then proceed to browse the page.

In various embodiments, supplemental content section 168 are provided within the detail page 150 to provide extra information to the user. This information may be relevant or helpful information, such as recommended items 170, which may be based on a variety of factors such as the user's purchase history, other customer purchase trends, and the like. Furthermore, the recommended items may be partner items that are provided with certain placement on the page in exchange for a fee.

While it may be clear that the content item 112 is part of a series by the delineation "Book 2" the user may not know how many items are in the series, which series are related, if the author has other books, or the like. As a result, the user may conduct additional searching, scrolling, and hunting to find the answer, which may lead to the user navigating away from the detail page 150. Embodiments of the present disclosure are directed toward providing the DIB to the user in order to carry forward relevant and helpful information in an easy to access and clear location on the page. Accordingly, the user may be alerted to other items within a collection associated with the content item 112 without conducting further searching or hunting for the information. Additionally, user preferences may be utilized in order to provide the most relevant content to the user, such as preferentially providing links to the digital editions if the user typically uses digital books rather than hard copies. In this manner, the user's cognitive load may be decreased by providing information in a clear manner while also providing a pleasing presentation of information where relevant content is organized for easy viewing and navigation.

Figure 2:
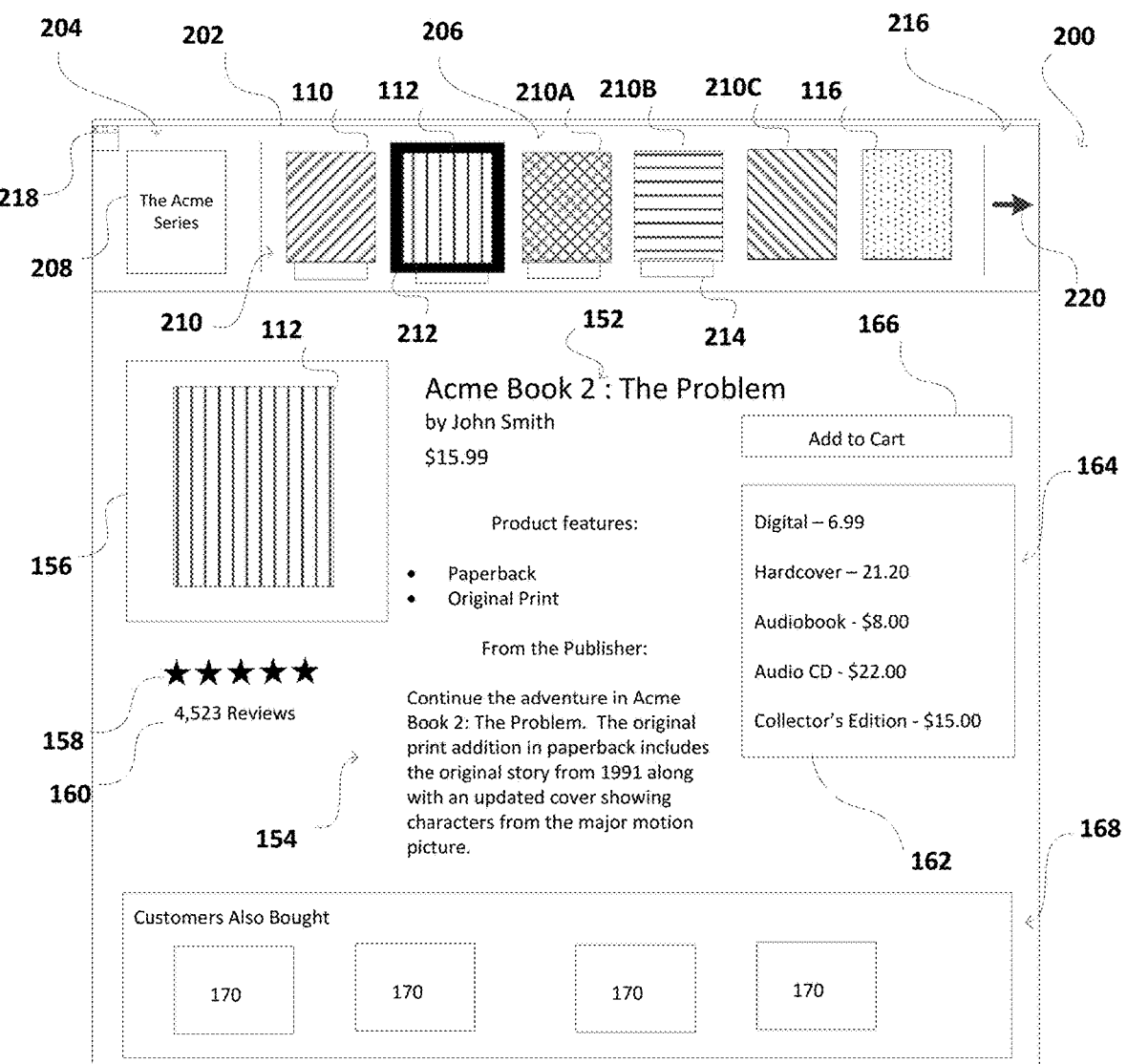
FIG. 2 illustrates an example interface that can be provided for display in accordance with various embodiments.

FIG. 2 illustrates an example detail page 200 including a DIB 202 arranged along at least a portion of a display area. The DIE 202 may be an interface, dynamic user interface area where the user can receive information, navigate through different segments, and interact with the area to follow links to additional information. It should be appreciated that, in various embodiments, the DIB may retain or otherwise incorporate previous search information into subsequent DIB content, thereby providing a path of browsing history in order to illustrate to the user how items may be related to one another (e.g., how items are within a collection). In this example, the content item 112 is selected and illustrated on the detail page 200 along with the title 152, product description 154, item image 156, ratings 158, and reviews 160. Furthermore, the additional purchasing options 162 with the links 164 are carried over from FIG. 1B. Accordingly, the user may maintain their familiarity with the detail page 200 and still receive the new information from the DIB 202.

In this example, the DIB 202 includes a first area 204, which may also be referred to as a "hook" or "hint" or "anchor" or "driver" to provide context to the second area 206, which may also be referred to as collections. For example, in this example, the first area 204 includes a content item 208 shown as "Acme Series" to inform the user that the content items 210 within the second area 206 correspond to the Acme Series. For example, the content items 110 and 116 from FIG. 1A are illustrated, which form part of the Acme Series. The additional content items 210A, 210B, 210C are related to other items within the Acme Series, which in this example includes six content items, but may include more or less in other examples. Accordingly, the user can readily see that the content item 112 corresponding to the detail page 200 is part of a series, is the second book in the series, and that other items are also available for the user.

As shown in the DIB 202, the content items 210 are arranged in an intuitive manner to provide information to the user. For example, the content items 210 are arranged in user. For example, the content items 210 are arranged in chronological order for how the books appear in the series. Moreover, the presently selected item includes an indicator 212 such that the user will know where they are with respect to the series. Additionally, various badges 214 may also be present. For example, the badges may provide additional information for the users. For example, the badge 214 may correspond to items that are presently owned by the user. Accordingly, the user can readily identify which items they already own to prevent inadvertent re-purchases and also identify and recognize other items within the series.

In operation, the DIE 202 may be dynamically modified based on interactions from the user. By way of example only, if the user changes the format of the content item 112 from the presently presented paperback edition to a digital edition, the item image 156 may change, along with various others features. Furthermore, content items 210 in the DIB may also change responsive to the selection. For example, different cover pages may be presented for digital editions, paperbacks, hard covers, special editions, and the like. Accordingly, the user will be presented with updated information responsive to their interactions with the content items on the detail page 200. That is, the user's interactions and searches are pulled forward (e.g., the user showed an interest in digital media, so the DIB 202 follows that interest in digital media). This dynamic update saves time and cognitive energy for the user, while also presenting the updated information in a pleasing and organized way. For example, rather than clicking through the DIB 202 for a new content item, and then selecting a new edition, the user can rapidly find the desired edition by going to the DM 202 based on a previous navigational choice.

The illustrated DIB 202 also includes a third area 216, which may also be referred to as an add-on area or a supplemental content area. The third area 216 may be particularly selected to provide additional information to the user that may be relevant and/or related to the collections currently presented. In various embodiments, the third area 216 is populated with information based at least in part on user preferences or user history information, such as past purchases. As an example, the third area 216 may include clickable links to digital video items corresponding to a television program for the Acme Fantasy Series. Additionally, the third area 216 may also include other related content, such as other books by the author of the Acme Fantasy Series, other fantasy series that are related, or the like. Accordingly, DM 202 may be dynamically adjusted to provide relevant content related to the user's interactions on the page, where the content is tied to the anchor provided by the first area 204.

Further illustrated on the detail page 200 is additional supplemental content, which may be dynamically adjusted responsive to the content in the DM 202. For example, the recommended items area 168 may be provided on the detail page 200 that includes items that are recommended or similar to the content item 112 from the detail page 200. It should be appreciated that in various embodiments content items 170 added to the recommended items area 168 may be particularly selected to prevent overlap with the DM 202. That is, items shown in the DIB 202 may be excluded from other areas on the page. Accordingly, the user is not overwhelmed or bothered with repeated recommendations for the same items. Furthermore, this allows more items to be presented on the page. Due to the limited content area, it may be undesirable to duplicate items. Accordingly, selecting items for other areas may be driven, at least in part, by the items already shown in the DIB 202. That is, in various embodiments, an item shown in the DM 202 may not be shown in one or more other regions.

It should be appreciated that the DM 202 may also be dynamically presented with respect to the detail page 200. That is, the DM 202 may adjust based on a user interaction with one or more components of the detail page 200. For example, the DIE 202 may collapse responsive to the user scrolling down the page, as the user scrolling may be indicative of an intent to search outside of the collection of items presented within the area 206. Additionally, in various embodiments, the DIB 202 may include an interaction menu 218 to provide customization options for the user. By way of example, the user may select to pin the DIB 202 to a top of the screen, change a position of the DIB 202, minimize the DIB 202, exit out of the DIB 202, and the like. Additionally, interaction menu 218 may include options to save or export the MB 202.

It should be appreciated that the adjustments to the DIB 202 may also include updating the MB 202 responsive to the user interactions on the detail page 200. As an example, the user may scroll down the page and information may be removed from the DIB 202, such as tags or other metadata, to provide a more streamlined look. Additionally, the DIB 202 may be minimized while scrolling and then expand when the user stops scrolling for a period of time. Furthermore, in various embodiments, the DIB 202 may further update different areas 204, 206, 216 responsive to the user's interaction with the page, such as updating the content 210 to a different media responsive to the user lingering on an area of the detail page 200 corresponding to a different type of media than the original search.

In various embodiments, DIB updates may also be driven by interaction within the DIB 202, such as a user interacting with a horizontal scrolling feature 220. The horizontal scrolling feature 220 may be used to update the content illustrated in the areas 204, 206, 216. For example, selecting the horizontal scrolling feature 220 related to the second area 206 may maintain the content within the first area 204 while updating content in the second area 206, for example to show additional items within the collection that may be ranked lower or otherwise not presented. However, it should be appreciated that the horizontal scrolling feature 220 may also be used to cycle through different Ms 202 having different hints and/or to provide additional information to see related items in the third area 216.

While embodiments of the present disclosure may include references to books, it should be appreciated that the present disclosure is not limited to only books. For example, movies, music, games, tools, fashion, and the like may utilize embodiments of the present disclosure to generate a DIB to carry forward user interactions. For example, movies may be part of a series, where the hint may include a movie series and the collection may be movies within the series or movies related to the series, such as movies that have guest appearances from other characters. As another example, music may include collections based on albums from a group or collections of other albums within the same genre, from the same record label, or the like. Another example may include games, such as card games, that are a continuation of a series with different "packs" or "decks" as well as games that may be from a similar publisher. Furthermore, tools may be grouped by brand, style (e.g., cordless), use intent, and the like.

In various embodiments, the generated DIB may be utilized to develop or supplement a user profile. For example, the user may opt-in to enabling tracking of their browsing data to provide information that may be utilized to provide improved recommendations. In certain embodiments, interactions with the DIB may then be categorized and utilized to track user interaction and engagement. In certain embodiments, the DM may be continuously updated for the user such that when a user visits a page a fresh DIB is generated, if sufficient information is provided. In various embodiments, the DM may be saved from a previous browsing experience and presented upon return to the site. In other examples, the DM may have a lifespan, such as a time duration or a number of searches/interactions.

Figure 3A:
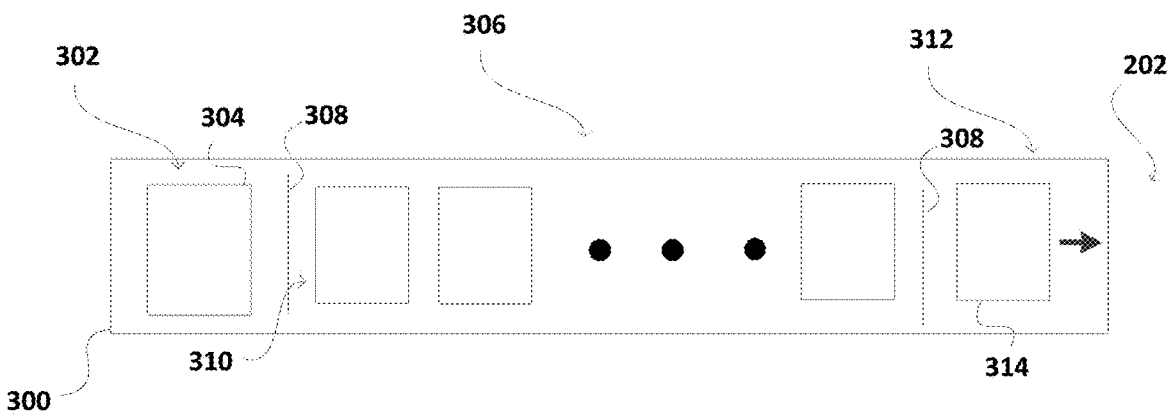
FIGS. 3A-3E illustrate example interface elements that can be provided for display in accordance with various embodiments.

FIGS. 3A-3E illustrate example configurations for the DM 202. The example shown in FIG. 3A illustrates a template that may be populated with information from a variety of sources. It should be appreciated that the relative size of the areas of the template may be particularly selected based on a variety of factors, such as customer preferences, content items for display, display size, display resolution, and the like. In this example, the DM 202 is illustrated as a widget 300 that may be arranged on a digital display in a variety of different locations. While its general orientation is shown as horizontal (e.g., an edge to edge orientation), it should be appreciated that the DM 202 may be vertically oriented and also may be configured to not extend across an extra edge or width of a page. The template includes a first content area 302, which may correspond to an "anchor" or "hint" or "driver" as noted above. The first content area 302 may include a hint content item 304 that corresponds to a theme or subject or topic for the DIB 202. In certain embodiments, the hint content item 304 may be the result of a "carry forward" of a content item previously selected by the user and/or may correspond to a content item of the detail page on which the DIB 202 is arranged. In other embodiments, the content item may correspond to another link or collection that has been curated. For example, the hint content item 304 may correspond to an item for purchase, a brand, an author, a curated list, or the like. The hint content item 304 may provide a clue or indication to the user as to why the content is being shown or to orient the user to the other content items presented in the DIB 202.

A second area 306, which may correspond to a "collection" or "group" as noted above, is illustrated separated from the first area 302 via a marker 308. It should be appreciated that the marker 308 may be any type of visual segregation or break between the areas 302, 306, but that in various embodiments the marker 308 may be omitted. For example, other graphical icons may be presented to separate content areas. Additionally, different design elements may also be included, such as different background colors and the like for different areas of the DIB.

Collection content items 310 are positioned within the second area 306 As noted above, in various embodiments the content items 310 may be dynamically adjusted based on the user's interaction with other areas of the detail page 200. By way of example, a book cover for a hard cover may be different than the paperback, and as a result, a user looking at a detail page with a hard cover may also see a DIB where the collection content items 310 correspond to the hard covers.

In certain embodiments, the collection content items 310 may also include different badges or tags, as described above. For example, the content items 310 may appear to be stacked when the content items 310 include additional copies, Additionally, the content items 310 may include indicators that correspond to badges including user ownership, indication of the next item in a series from the user's current location, and the like. For example, if the user had finished the first two books in a four book series, the first two books may be marked as owned and the third may be highlighted as the next in the series. Highlighting or applying a badge may include a variety of different options, such as changing a background color, providing a border or outline, including a tag or flair, or the like.

As noted above, the collection content items 310 may be selected based at least in part on the hint content item 304. The hint content item 304 may correspond to a product for sale in an online marketplace, which may be represented by an ASIN that may also include metadata providing information about the hint content item 304. For example, the hint content item 304 may be stored in a database providing information for associating the item with various classifications or groups. As an example, the Acme Fantasy Series may include key-value pairs to identify certain features of the item that may correspond to a group, such as Genre: Fantasy; Author:Smith; Series:Acme. Accordingly, items selected for the collection content items 310 may evaluate these key-value pairs or other metadata for matching information that provides for a logical grouping of the items.

The illustrated template also includes a third area 312, also separated by the marker 308, that may correspond to "add on" or "supplemental" content. It should be appreciated that in certain embodiments the third area 312 may be obscured or non-visible until the user selects to scroll over to the third area 312. For example, an icon may be presented indicating to the user the capability for scrolling and to see additional content. In this manner, the primary content from the collections may be preferentially presented to the user, with the third area 312 being shown responsive to the user showing an interest in additional content.

The third content area 312 includes the supplemental content items 314, which may correspond to other items that are related to either the hint content item 304 and/or the collection content items 310. For example, the supplemental content items 314 may be items from a similar author/brand as the collection content items 310, may be items related to the collection content items 310 (e.g., different media format), or the like. By relating the supplemental content items 314 to the hint content item 304, the user is still provided with relevant items in the DIB 202 and also given the opportunity to expand their browsing without extra clicking or searching.

Figure 3B:
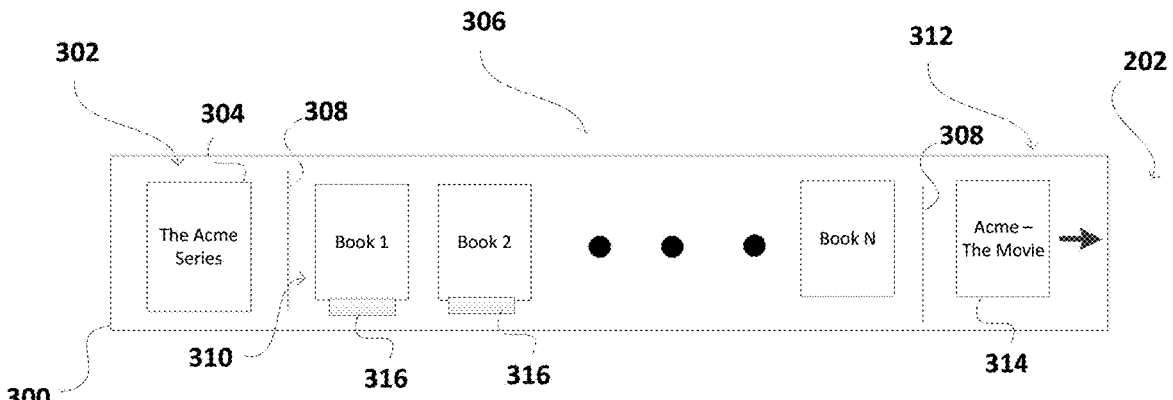

FIGS. 3B-3E illustrate sample DM configurations for a variety of different scenarios associated with the first area 302. For example, FIG. 3B illustrates the DM 202 where the first area 302 is associated with a series. Accordingly, the first area 302 includes the hint content item 304 corresponding to the series and the collection content items 310 are other items within the series. As an example, the series may correspond to a book series, a TV program series, a movie series, a toy series, a comic book series, a graphic novel series, or the like. Furthermore, series may be further curated such as a "build your own PC series" that includes various parts selected in the collection that are known to work together or a "starter kitchen" series that includes certain items a person may like for a first apartment kitchen. In this example, the third content area 312 includes items related to that series from the first area 302, such as an associated movie series.

In this example, the content items 310 corresponding to "Book 1" and "Book 2" are shown with badges 316 indicative of ownership of the item. For example, the user viewing the DIB 202 may have already purchased the item, either through the present seller or the purchase may be made known through a secondary media device with an account linked to the present seller. The bade 316 may also indicate a format of ownership (e.g., digital, paperback, etc.) along with other information to guide the user's selection. For example, a different color of badge may appear for digital copies than for paperback or hard cover copies to provide the user with additional information so that the user is not surprised when they discover that they do not have a digital copy of one of the books.

Figure 3C:
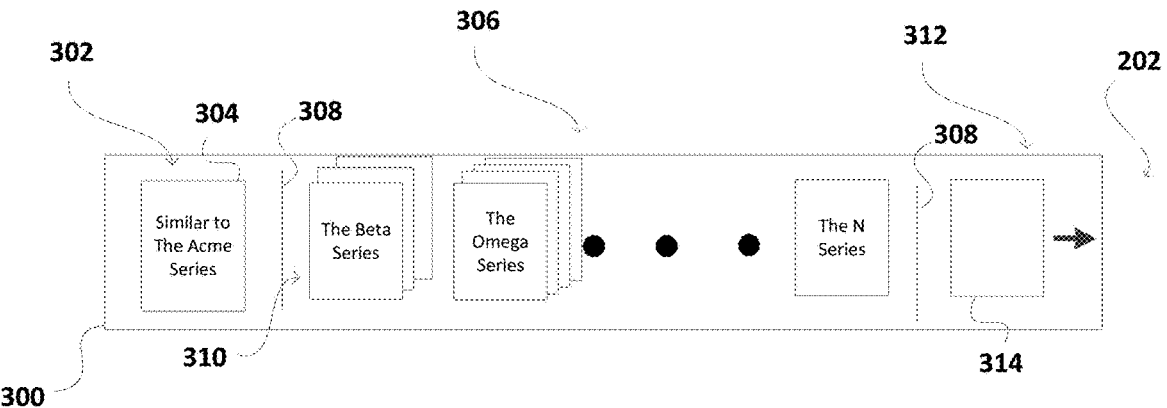

FIG. 3C illustrates another example DM where the first area 302 is associated with the hint content item 304 corresponding to series or collection, such as the series associated with the collection content items 310. In this example, the user is provided with a verbal clue related to the collection content items 310, specifically "Similar to The Acme Series" to illustrate that items within the second area 306 are related to The Acme Series. The DM may be dynamically adjusted to present the example, such as if a user were to click on related items after they completed a series, the DIB may populate the collection for similar or related series to provide the user with additional content. In this case, the collection content items 310 may include stacks as graphical elements illustrating a number of content items that correspond to each of the recommended series. For example, a larger stack may indicate more books in a series, which may provide additional guidance for the user when making a selection. Accordingly, the user's previous behavior (e.g., consuming content from an entire series) may be carried forward into the DIB to provide additional collections of items related to the series. Moreover, the user's searching or browsing data also provides information for populating the DIB, such as by clicking on a link for suggested recommendations after completing a series.

Figure 3D:
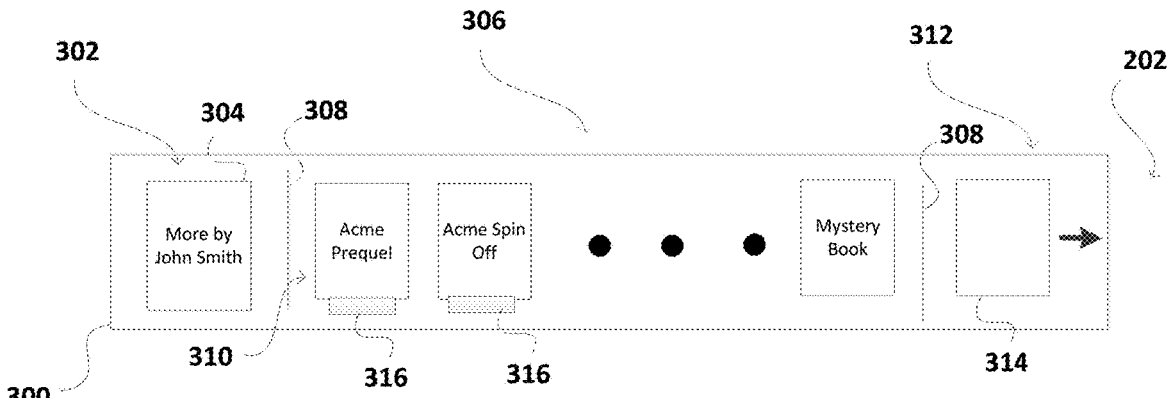

FIG. 3D illustrates an example DIB where the first area 302 is associated with the hint content item 304 corresponding to an author and the collection content items 310 correspond to works by the author. For example, in the case of books, writers may product content in different genres, with different themes, as different series, and the like. Moreover, authors may use pseudonyms that are later discovered, providing additional content to their catalog. Accordingly, the collection content items 310 may include other works by the author. In this example, author "John Smith" has produced additional books related to the Acme Series, such as the "Acme Prequel" and the "Acme Spin Off," along with other books, like the "Mystery Book." Accordingly, the user is provided with this information. As will be appreciated, the information in the DIB may be more visually pleasing and easier to navigate than a list of search results for everything related to the author John Smith. By way of example, the author's search page may include multiple editions, duplicate links from different sellers, and the like. Providing the desired information in the DIB may enable the user to browse more easily, for example without having to return to a previous window or open a new tab, while also collecting relevant information for the user. The user may navigate to this DIB by selecting the author link when viewing a detail page, where such behavior indicates the user's intent to find out more about the author and not the specific item of the detail page previously viewed. Accordingly, that search information is carried forward through the first area 304 to populate the second area 306 and provide content suggestions to the user.

Figure 3E:
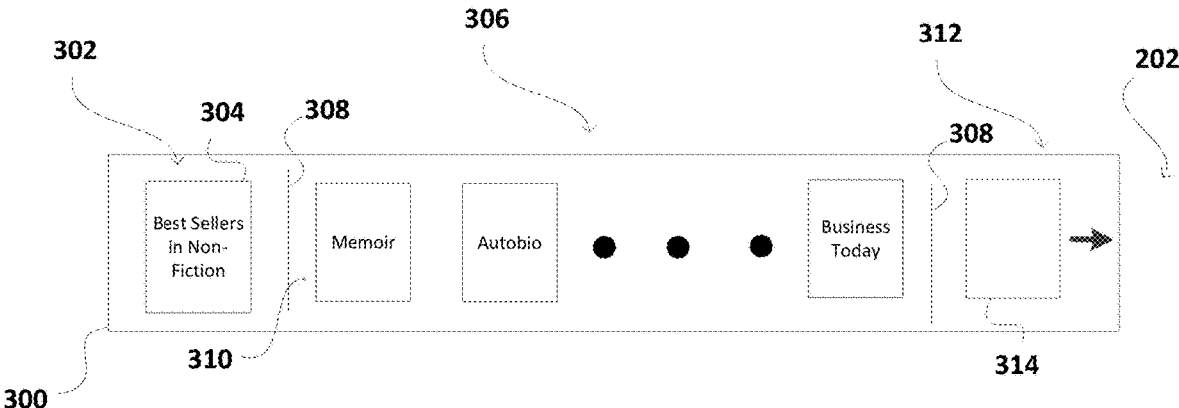

FIG. 3E illustrates an example DIB where the first content area 302 is associated with the hint content item 304 corresponding to a curated collection and the collection content items are items within that curated collection. For example, a provider may include lists for users to browse or may obtain lists from other publications. These lists may include recommendations, best sellers, and the like. A user may be browsing and then select the list to view new or recently popular books, movies, video games, items, clothing, etc. If the user were then to navigate to a detail view for an item on the list, the DIB may carry forward the user's search by providing additional items from that list. Accordingly, if the user was unhappy with their previous selection, rather than returning to the previous page, the user could go to the DIB to find another item. In this manner, the amount of content viewable for the user is increased because relevant information from a first page, that is subsequently navigated away from, is maintained and provided on a second page.

It should be appreciated that the examples shown in FIGS. 3B-3E are for illustrative purposes only and are not intended to limit the scope of the present disclosure. For example, different types of hint content items 304 may be provided such as different brand names, styles of clothing, types of sporting goods, and the like. Furthermore, the collection content items 310 may correspond to items that may work well together, alternatives, a ranked list of popular items, or the like. Additionally, the user may navigate away from the DIB, for example by interacting with different content, and thereafter the DIB may be adjusted, rather than carry forward the previous content.

Figure 4:
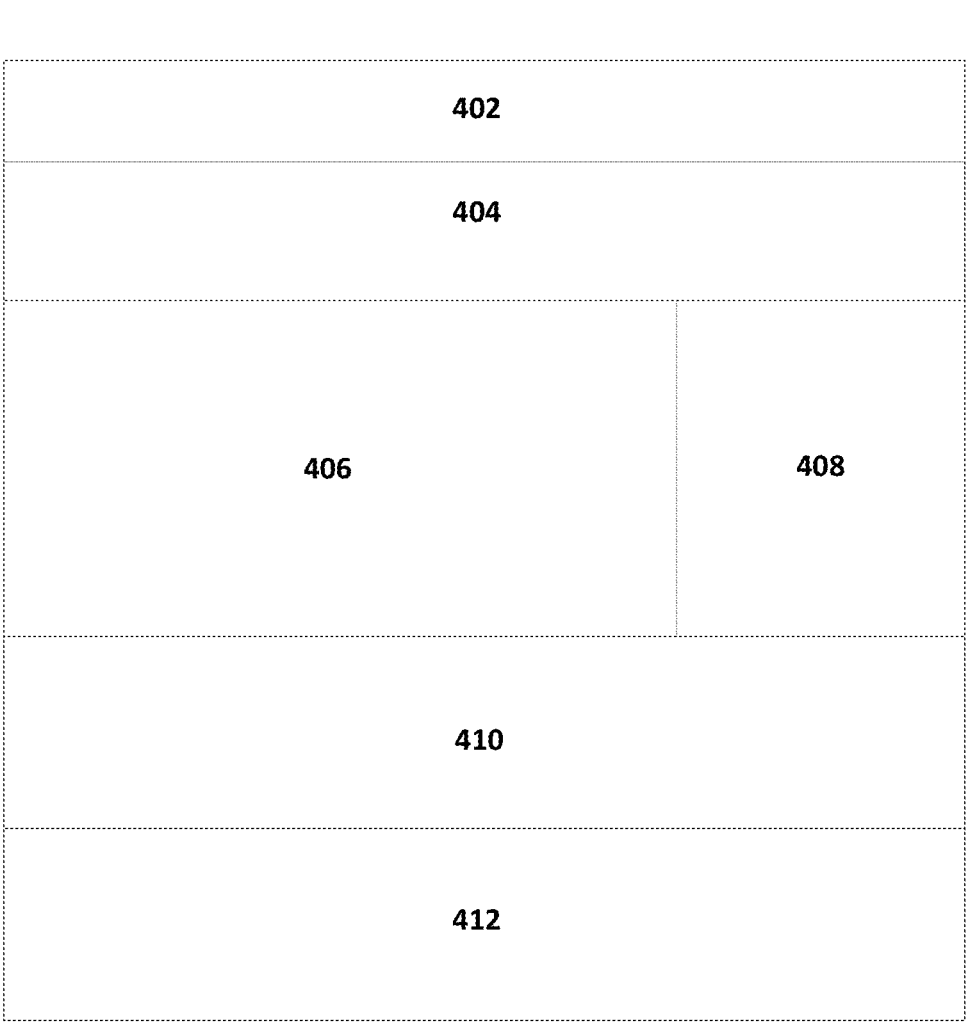
FIG. 4 illustrates an example interface template that can be populated and provided for display in accordance with various embodiments.

FIG. 4 illustrates an example interface 400 that can be dynamically customized for a user in accordance with various embodiments. In this example, there are various presentation options that are available for a particular viewer of the interface. As mentioned, user information, such as a user profile, may be utilized to dynamically customize one or more portions of the interface 400. As an example, user behavior and activity data may be utilized in order to populate one or more areas of the interface 400. Behavior data can include browse data which can be related to historical browse habits of users with respect to an item. Included in the browse data is clickstream data which specifies paths users have taken while browsing an application, Web site, or other network resource in order to reach specific items. Each distinct selection made adds one click to the stream. The browse data also includes information regarding the nature of the selections being made. This includes, but is not limited to, the number of times content has been selected or clicked upon, the number of times content has been selected for purchase or placed in a "shopping cart," and the number of times content has actually been purchased. For example, each time a user browses to and purchases a coffee mug featuring a popular television character, details of that transaction are gathered and stored as behavior data. It should be appreciated that this information may be collected in accordance with authorization provided by the user.

In this example, the interface 400 corresponds to a detail page, such as the detail page 200, but with additional information provided for the benefit of the user. It should be appreciated that various embodiments may be described with reference to a webpage, but that is only an example and embodiments described herein are also application to other interfaces, such as interfaces included in various types of applications. In this example, content for the page (i.e., the HTML, DOM, or other such layout code, markup language, or script) is analyzed to segment the page into navigable sections. In this example, the sections can correspond to a header frame (top), a DIB frame (below the top), a product frame (left), a purchase options frame (right), and dynamic content frames (bottom) that may include advertisements, recommendations, or the like. Various other sectionings could be utilized or determined as well within the scope of the various embodiments.

In this example, a header frame 402 includes information related to the provider of the webpage, such as a search bar, buttons to access user data, navigational items, and the like. Below the header frame 402 is the DIB frame 404, as shown in FIG. 2. The DIB frame 404 may be a dynamically adjusted frame that includes information within one or more portions, as described in FIGS. 3A-3E, to carry forward a user's browsing intent and to provide additional information to the user. As an example, a user searching for a book series may find the DIB populated with other books within that series, which may be presented in chronological order, to facilitate browsing and purchasing. While the DIB frame 404 is arranged near the top of the current interface 400, it should be appreciated that the DIB frame 400 may be arranged at a variety of different locations and may also have a different orientation (e.g., vertical).

The example also includes the product frame 406 and the purchase options frame 408, which may be populated with information responsive to a selection by the user. Additionally, dynamic content frames 410, 412 may also be included to provide additional options to the user, such as advertisements or recommendations. In this example, the interface 400 may be considered an "above the fold" interface, where the user will typically see each of the frames when they load a webpage, although it should be appreciated that different spacing or sizing may also be included based on a variety of factors, such as user's screen size, screen resolution, and the like. Accordingly, there is a limited amount of space to provide relevant information to the user. Embodiments of the present disclosure including the DIB frame 404 increase the quantity of information provided to the user by prioritizing information within similar collections to the item within the product frame 406, thereby highlighting relevant information for the user.

Moreover, by carrying searching and browsing information forward, the user may view data that is has been maintained from a previous page. By way of example, a user's initial search results for a search for a "series" may be grouped into the DIB on a subsequent detail page, providing the user with the results with navigating back to the previous page.

Embodiments of the present disclosure may be utilized as a modular template that can be populated with different content segments or "cards" based on various factors, such as a user's device settings, a user profile, the content itself, promotional events, or the like. Accordingly, users may receive personalized content presentations that include various sections of information that may be relevant to the user. Furthermore, the various templates may be selected in order to increase a viewing area available for recommends or content elements. By way of example, content shown within the DIB may be excluded from the dynamic content frames 410, 412, thereby reducing redundancy for the user while also maximizing the available viewing space with unique content elements. It should also be appreciated that various templates may be designed for different viewing situations, such as mobile applications that may have a reduced screen size and may also adjust orientation (e.g., portrait or landscape). Moreover, due to the reduced screen size, the DIB and/or the template on a mobile device could be simplified bar that resembles the basic elements from desktop such as labels, thumbnail images, etc. The simplified DIB could also be represented as a compact row that enables the user to reveal more details from the DIB in a bottom sheet overlay. This interaction helps allow the user to utilize more screen real estate as needed, rather than always presenting all available details. Furthermore, in various embodiments, the DIB may integrated into a voice assistant or other consumer interaction device where the results in the DIB may be verbally relayed to the user and user interactions may correspond to voice inputs from the user.

Figure 5A:
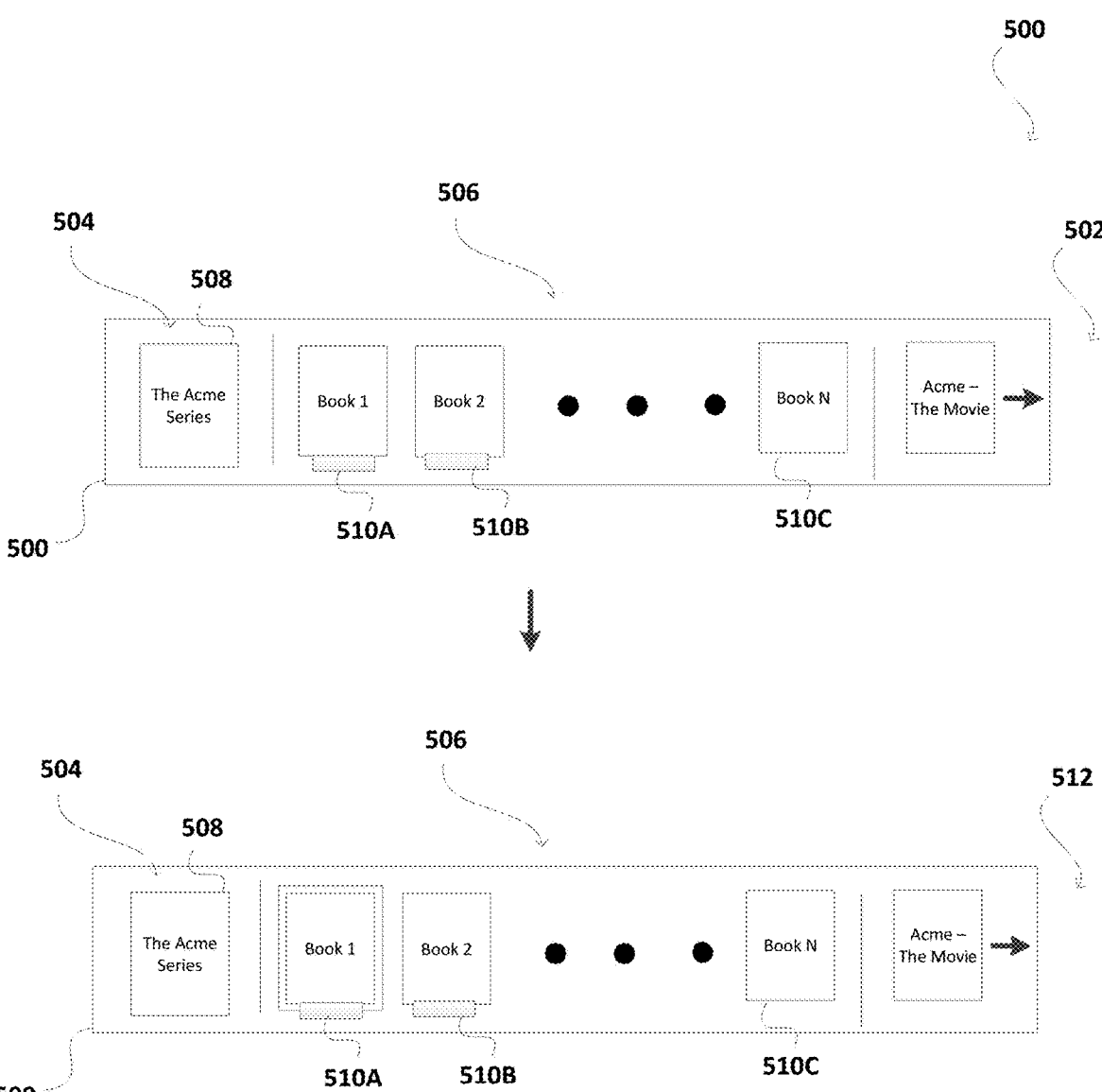
FIGS. 5A-5C illustrate example interface interaction flows in accordance with various embodiments.

FIG. 5A illustrates an example navigation environment 500 where a user may navigate using the DIB 202. A first DIB state 502 is presented including a first area 504 (e.g., the hint area) and a second area 506 (e.g., the collections area), where the first area 504 corresponds to a content element associated with a book series and the second area 506 corresponds to books within the series. As shown, a first area content element 508 is arranged in the first area 504 while several second area content elements 510A-510C are shown in the second area 504.

As the user makes a selection, the DIB is updated, as shown in the second dib state 512. In this example, the user has selected the first second area content element 510A, which is present within the DIB, and as a result is indicative of an intent to maintain the hint associated with the first area content element 508. It should be appreciated that in other embodiments the first area content element 508 may change based on a selection of an item within the collection. The second area 506 maintains the second content elements 510A-510C that correspond to the first area 504. That is, the user's intent may be directed toward viewing a particular book within the series, however, by selecting an item within the DIB, the user has shown an attempt to stay within the collection represented by the DIB. In other words, the user's action have not provided an indication to move away from the collection. Various other actions may provide such as indication, as will be described below, such as selecting content elements outside of the DIB, updating a search, selecting a particular hyperlink, or the like.

Figure 5B:
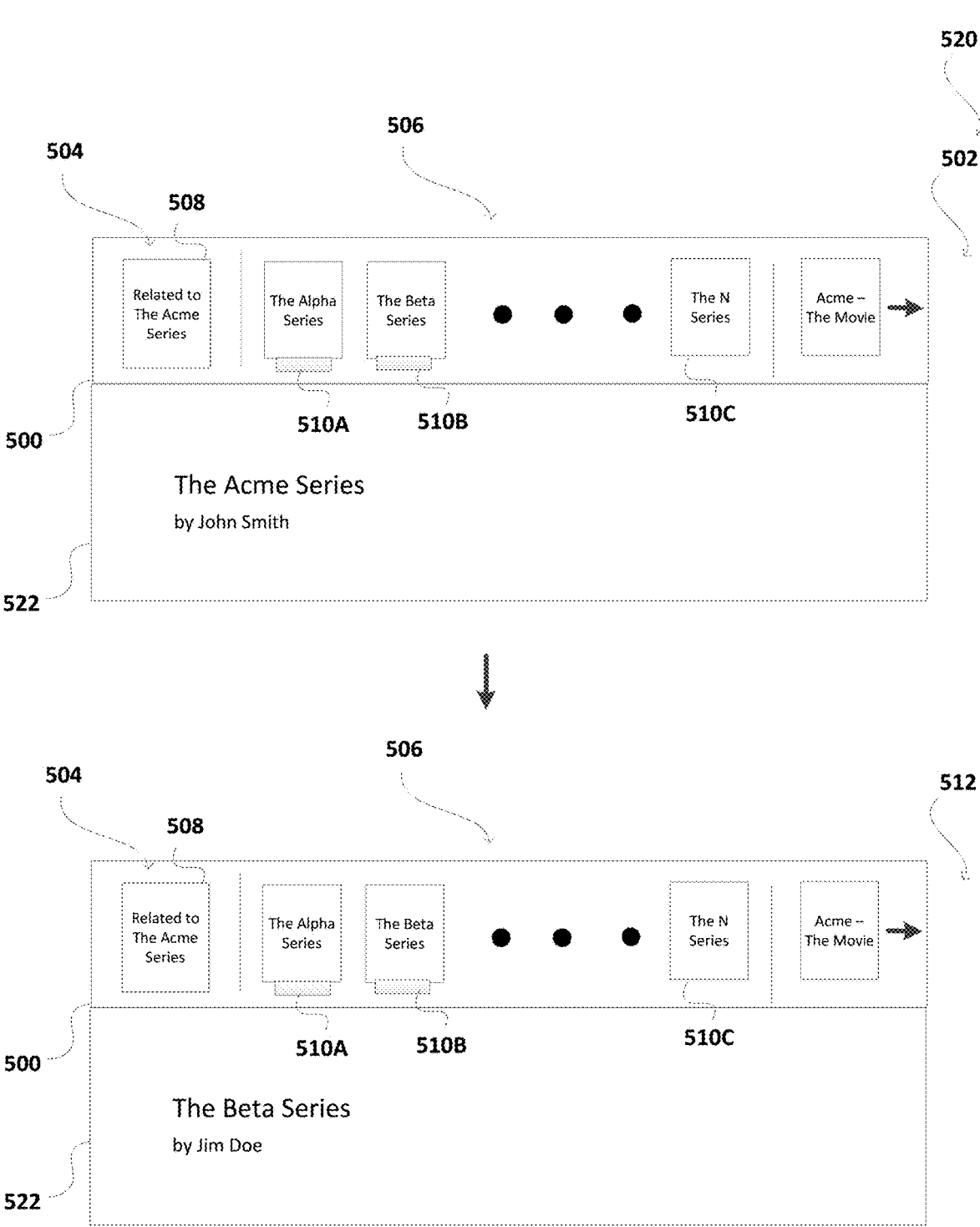

FIG. 5B includes an example navigation environment 520 illustrating the first DIB state 502 and the second DIB state 512. In the first DIB state 502, the first area 504 corresponds to a "related to" section illustrating various second area content elements 510A-510C related to the first area 504. Staying with the example of a book series, the first area 504 may correspond to books related to a particular series where the second area 506 may include recommended series that share one or more features with the book series (e.g., genre, author, characters, age group, etc.). In this example, the first DIB state 502 is associated with a detail page 522 for the Acme Series, which is also related to the hint in the first area 504. The detail page 522 may be a series page that includes information on items within that series and provide navigational links for users to further explore individual components of the series.

The second DIB state 512 mirrors the first DIB state 502 after the user interacts with an item in the DM (e.g., "The Beta Series"), but the detail page 522 is updated responsive to the user's selection. Now, the Beta Series detail page is illustrated, however, the DM 500 maintain its previous set of information because the user selected an item within the DM 500. Further navigation may lead to updates to the DM 500 based on the determined user intent.

Figure 5C:
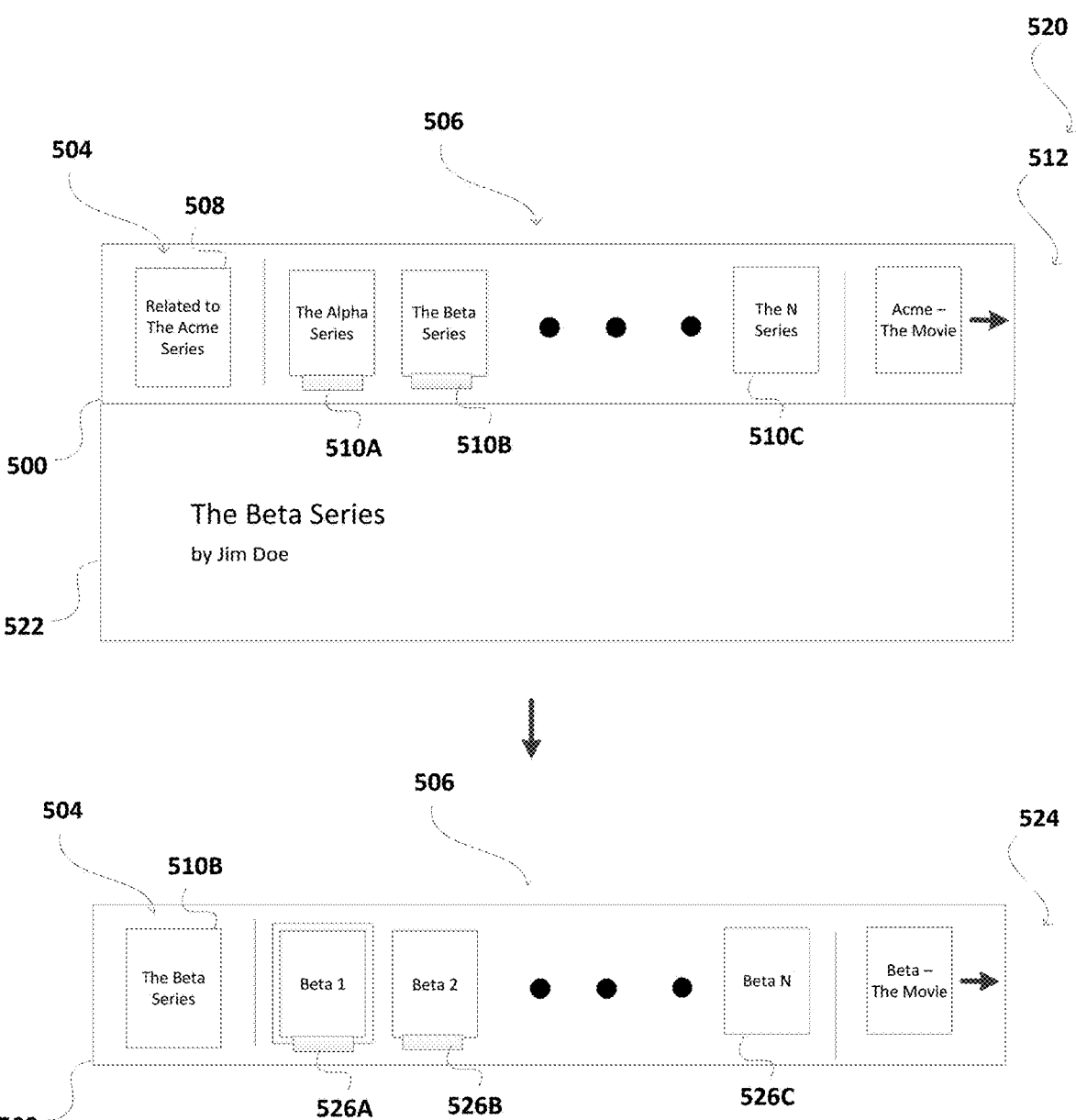

FIG. 5C illustrates a continuation to a third DIB state 524 where the user has interacted with content within the detail page 522 corresponding to the Beta Series, and subsequently the DIB 500 is updated to the third DM state 524 reflective of the user's intent to obtain additional information for the Beta Series. Accordingly, the first area 504 updates to the second area content element 510B (e.g., the Beta Series) and the second area includes new second area content elements 526A-526C corresponding to items associated with the second content element 510B, such as books within that selected series. In other words, the user's navigational intent has caused the DM to update, while also carrying forward information to illustrate the content was updated (e.g., to show the user the update was based on their selection of the book series). As a result, the user has navigated out of the first collection presented and into a second collection updated based on the user's input.

Figure 6:
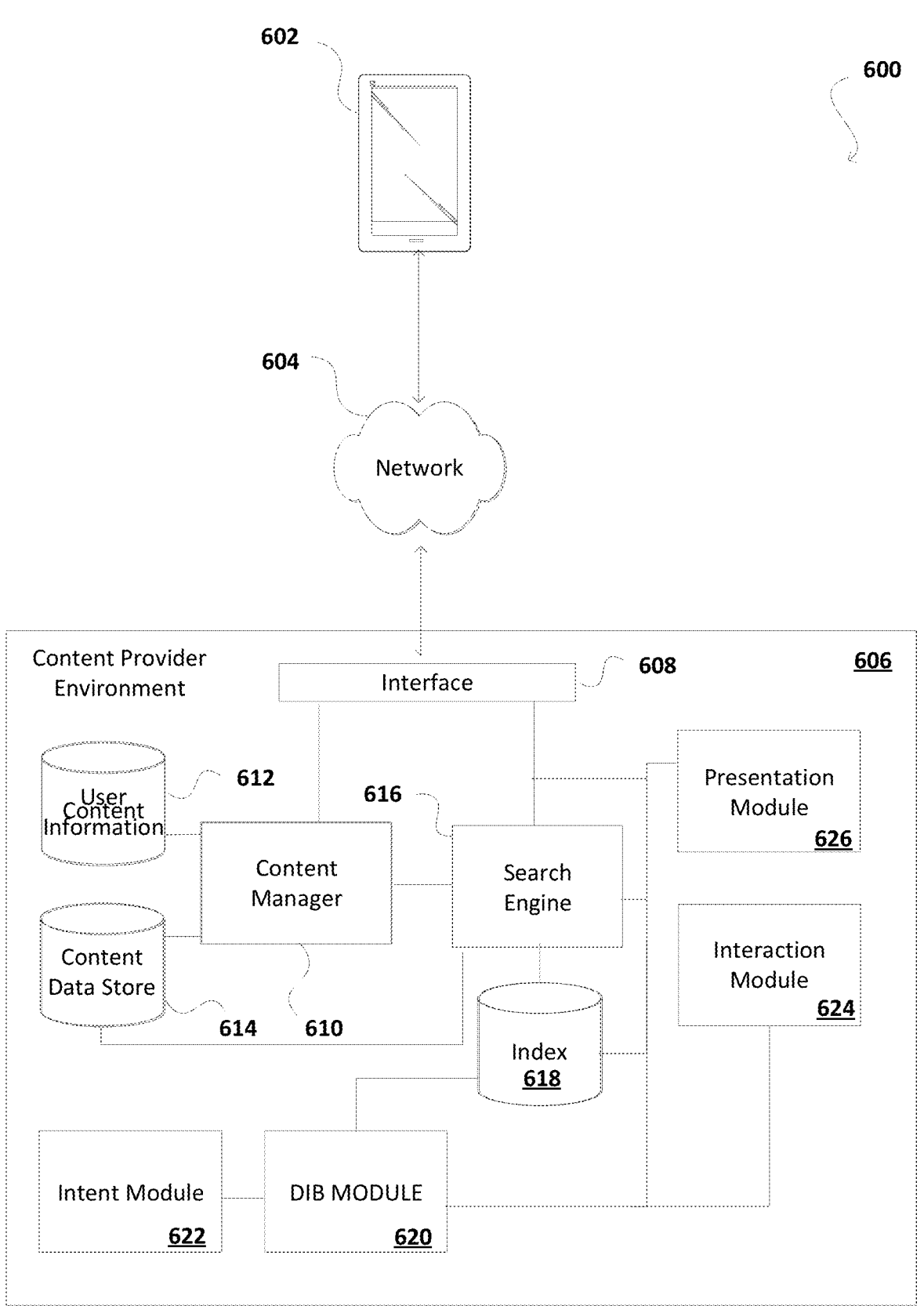
FIG. 6 illustrates an example content provider environment that can be utilized to implement aspects in accordance with various embodiments.

FIG. 6 illustrates an example environment 600 in which aspects of the various embodiments can be implemented. In this example, a computing device 602 is able to submit a query for information across one or more networks 604 to a content provider environment 606. The provider can provide an online store in some embodiments, where the content may relate to produces offered through the store. The network(s) can include any appropriate network, such as the Internet, a local area network (LAN), a cellular network, an Ethernet, or other such wired and/or wireless network. The content provider environment 606 can include any appropriate resources for providing content from a resource provider, as may include various servers, data stores, and other such components known or used for providing content from across a network (or from the "cloud").

In this example, a request received to the content provider environment 606 can be received by an interface layer 608 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 610 and/or content servers, which can obtain the content from a content data store 614 or other such repository to be sent back across the network(s) to the computing device. In some embodiments, information for the request might also be compared against user data in a user data store 612 or other such location do determine, for example, whether the user has access rights to that content. In some embodiments user data might also be analyzed to determine which type of content to provide, additional supplemental content to provide with the primary content, and the like.

In some instances the request for content may include at least one search query. The content server 610 can work with a search engine 616 to execute the query against an appropriate search index 618, which may be structured or unstructured, in order to determine results to return to the client device 602, using content pulled from the content repository 612. It should be appreciated that the search engine 616 may work with a query component or parser in order to determine various terms for the search, remove stop words, or perform other pre or post processing prior to executing the search against the search index. While embodiments may be described with reference to a search query, it should be appreciated that other embodiments may include interactions with content elements to drive generation and/or updates to the DIB. As an example, a user may navigate to a homepage or landing page and click on a recommended item or segment from the landing page without presenting a separate query. In various embodiments, this initial interaction may also be utilized to establish the hint and generate a DIB. Other examples of potential interactions to drive DIB generation and/or updates include ASIN links, category links, and the like.

In various embodiments, a DIB module 620 is utilized to select content for presentation within the DIB, as described above. For example, the DIB module 620 may receive information from an intent module 622 to execute a query against the index 618 or another index in order to select content for presentation within one or more content areas of the DIB. For example, the intent module 622 may evaluate a user's interaction with various content elements on a page by receiving information from the interaction module 624 that may track the user's action. The interaction module 624 may determine a type of action (e.g., clicking on a link, typing in search query, changing an option), an area of interaction (e.g., a new search area, clicking within a certain frame, etc.), a conversion, or any other type of interaction the user has with the application and/or content presented on the device 602. Accordingly, the user's intent may be inferred based on that information. For example, a user changing a content type for an item, such as changing from a digital copy to a hard copy of video game, may be indicative of a user's preference. This information may be provided to the DIB module 620, as noted above, in order to present content in the user's desired format. As another example, the interaction module 624 may determine that the user has navigated within the DIB, which may infer the user's intent to remain within the category or collection presented within the DIB. Accordingly, updates to the DIB may follow this intent by providing additional content from the collection or content highly relevant to the collection.

In various embodiments, the DIB module 620 may also be utilized to determine whether sufficient information exists to generate the DIB. For example, a single user input may not provide enough relevant information to narrow down content elements for the DIB. As a result, the DIB module 620 may delay generate of the DIB until a threshold amount of information is received. In certain embodiments, it may be determined that recommended items provide more useful information than the DIB items, and a result, the DIB module 620 may delay generation of the DIB until enough information is provided to generate relevant information for the user.

In this example, the presentation module 626 may receive information from the content manager 610 and the DIB module 620 in order to select how the information is presented to the user. It should be appreciated that the presentation module 626 may adjust content presentation based on one or more user preferences, user device settings, or the like. As an example, content presentation between a desktop computer with a large screen may differ from content presentation on a handheld device, such as a smart phone.

In operation, a user may submit a search query that is executed against the index 618. Content relevant to the search query may be identified and presented to the user. Based on the user's intent or interaction with content, either present or past, the DIB module 620 may generate the DIB for presentation to the user, where the DIB carries forward the user's previous search results and interactions to provide relevant content that is easily accessible without navigating to a different page. As the user continues to interact with the presented content, the DIB may be updated, for example, upon receiving information indicative of a user's interaction with the screen. A user intent may be inferred from the interaction, such as determining that a user selecting a link within a certain frame or window corresponds to an intent to continue browsing for similar information. Thereafter, the DIB may be updated based on that intent, for example by running a subsequent search against an index to identify collections or grouped items relevant to the content selected by the user.

FIG. 7 illustrates an example DIB module 620 that may be used in accordance with various embodiments. In this example, the DIB module 620 may be utilized to receive input, such as a search query, user intent information, user profile information, and the like to determine collections to present within a DIB populated responsive to a user search and/or interaction. In this example, an interaction processor 700 may receive a search query and/or a user interaction associated with a product in an online marketplace. For example, the user may select an item from a list of search results. The interaction processor may be utilized to identify collections in a collection data store 702 associated with that interaction. As an example described above, if the user's interaction is associated with a book series, a collection may include each book within that book series. The collections data store 702 may be populated using a collection machine learning system 704, that may include an extraction module 706 that obtains information from a product data store 708. As an example, the product data store 708 may include various products that have metadata, tags, or a hierarchical tagging or formatting structure. The extraction module 706 may analyze the metadata to determine information about the products that may be useful for classification a classifier 710. A non-limiting example of classification information may include author, brand, title, genre, format, price, and the like. The classifier may be neutral network classifier that is trained using prior information from a training data set 712. By way of example, the classifier may be used to group items having the same author within the same genre. As another example, the classifier may also group items from the same publisher within the same genre. Accordingly, various connections may be made in order to associate different products to one another, which may be utilized to form the collections populating the collections data store 702.

It should be appreciated that a variety of different machine learning systems may be utilized in order to form the collections. In an example the neural network is an artificial neural network (ANN) that includes a multiple layers of nodes, including an input layer, an output layer, and multiple layers of intermediate nodes, often referred to as "hidden" layers, as the internal layers and nodes are typically not visible or accessible in conventional neural networks. There can be additional types of networks or models used as well, as well as other types of neural networks including other numbers of selections of nodes and layers, among other such options. In certain embodiments, all nodes of a given layer are interconnected to all nodes of an adjacent layer. The nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

In an example, collections refer to groups of items that share one or more common traits and, in various embodiments, may be described by a common title or heading. Returning to the example of books used above, a collection may include each book within a series. Furthermore, a collection may include each book written by an author. Accordingly, a collection may refer to a grouping of similar items that are connected by a common theme or salient feature. Collections may be determined by presenting an input to the machine learning system, which may include information extracted from the query, such as an author, a title, or a user interaction. The network may then process this information to classify related information, based at least in part on the input parameters.

Figure 8:
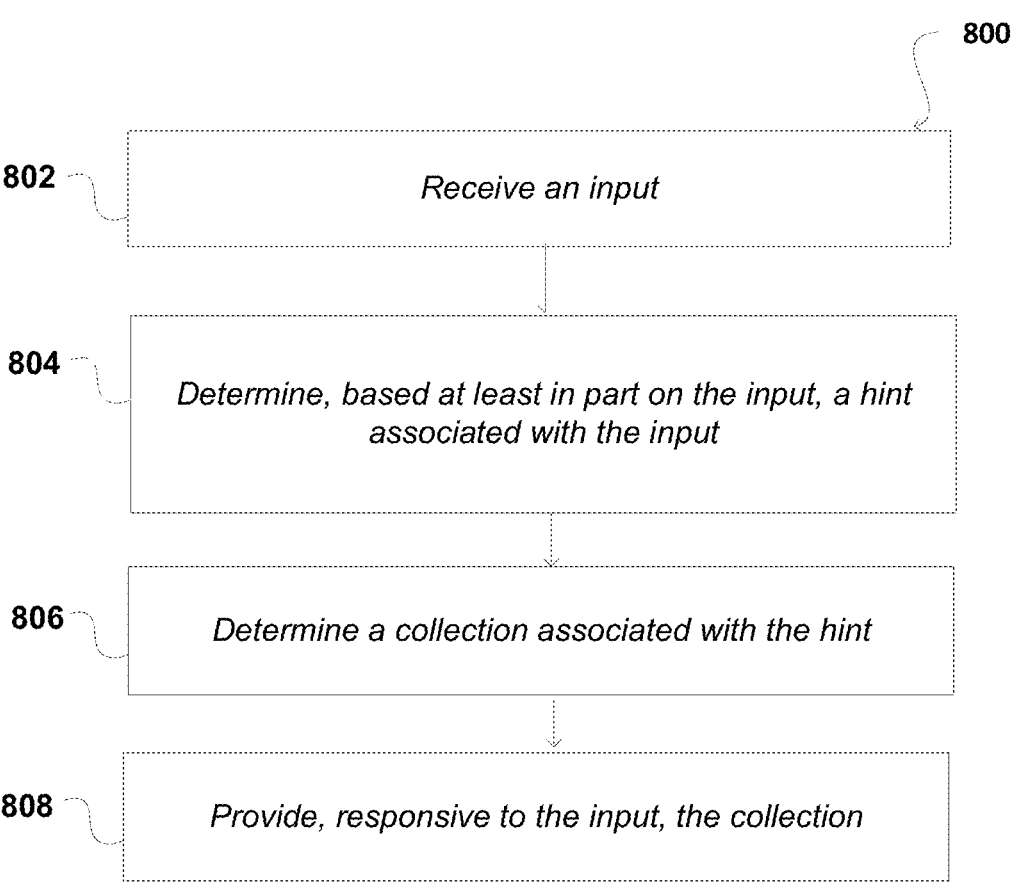
FIG. 8 illustrates an example process for providing a collection responsive to a user interaction that can be utilized in accordance with various embodiments.

FIG. 8 is a flow chart of an example process 800 for presenting a DIB responsive to a user input. It should be understood that, for any process discussed herein, there can be additional, fewer, or alternative steps, performed in similar or different orders, or in parallel, within the scope of the various embodiments unless otherwise stated. In the example, an input is received 802. The input may correspond to a user search query, a user selection of an item, a user changing an option for an item on the detail, or any other reasonable input. For example, the user's browsing on a provider's website may be tracked to determine how the user interacts with content. Different content elements may provide different notifications indicative of the user's interaction. As a result, a user clicking on a link responsive to a search query may provided a different notification regarding the user input than a user changing an option from a detail page. Each of these interactions may be useful in populating the DIB. However, different types of inputs may be more important or provide more information than others. As an example, a user selecting an object from a list of search results may provide more information than a user selecting a "medium" t-shirt rather than a "large" t-shirt.

In various embodiments, a hint is determined based at least in part on the input 804. As noted above, the hint may correspond to items within the first area of the DIB that drive or otherwise anchor subsequent results. The hint, in various embodiments, may correspond to an item selected by the user, a list selected by the user, or a category selected by the user, among other options. The hint may also be extracted from metadata associated with an item. For example, an item for sale in an online marketplace may be categorized in a hierarchical structure, where different levels may provide information for categorizing or otherwise grouping the item. By way of example, a baseball may be categorized as Sporting Goods—Outdoor Sports—Team Sports—Baseball—Equipment—Balls. Accordingly, one of these levels may be utilized as the hint. In another example, the hint may be associated with a particular characteristic of the input. For example, the user may select a book that's part of a series, and as a result, the hint may be the series itself. As another example, the user may select a link associated with an author's page, so the hint may be titles by the author. As described above, the hint may also be changed or adjusted based on the user's subsequent interactions.

The hint may be used to determine a collection 806. For example, the hint may correspond to a list of related or recommended items generated using one or more machine learning methods, as described above. Continuing with the examples from above, the hint for the baseball may be associated with the brand, the size, the style, or the like. If the hint were the brand, the collection may include other baseballs made by the same brand. If the hint were the style (e.g., practice balls, game balls, etc.), the hint may be other balls of that style, but my also correspond to other brands. As another example, if the hint were a book series, the collection may include the other books in the series. Moreover, if the hint were an author, the collection may include other books written by that same author. Accordingly, the collections may correspond to related items that include a similarity or association with the hint. As will be appreciated, collections may be predetermined for a variety of popular items or search queries. For example, a best selling movie series may have collections readily available.

The collection is then provided to the user 808. For example, an area of a display screen may include the DIB, which provides content elements associated with the items in the collection. The DIB may be positioned at a prominent location on the display, such as a top, for easy access and vision by the user. Moreover, the DIB's size and location may be particularly selected based on one or more properties of the display. By way of example, information regarding the display size, display resolution, display orientation, and the like may be received and evaluated to determine one or more factors associated with the DIB, such as placement, size, size of content elements, number of content elements, and the like. For example, a smaller display may lead to a DIB with fewer content elements so that the content elements are visible and/or clickable on the smaller screen. In this manner, the hint from the user interaction may be utilized to drive content to populate the DIB.

Figure 9:
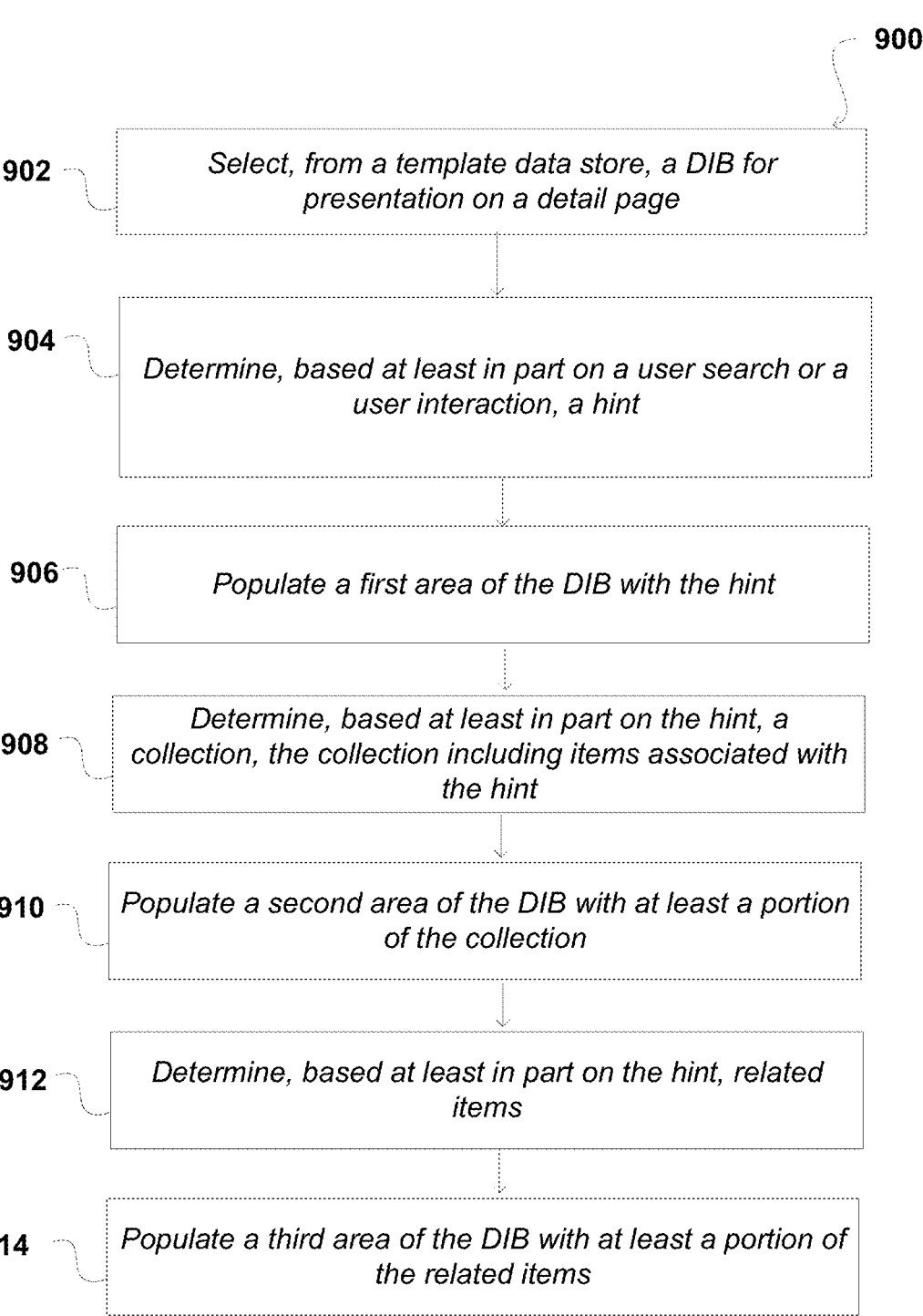
FIG. 9 illustrates an example process for populating a template responsive to a user interaction that can be utilized in accordance with various embodiments.

FIG. 9 is a flow chart of an example process 900 for populating a DIB. As described herein, the DIB may include a selectable content area provided responsive to a user interaction to present content elements to the user. The DIB may be associated with the user's interactions in order to provide additional relevant information to the user while also reducing the navigational and cognitive input of the user. That is, search results or related items may be carried forward after the user makes a selection so that the user can continue to view previous information, or newly provided information, along with their search selection. It should be appreciated that the DIB may be dynamically adjusted content area that may be populated from a data store that maintains collections of items. The DIB may also be easily adaptable to different displays and orientations as part of a template. In this example, a DIB template is selected from a data store 902. For example, the DIB template may be for a DIB associated with a detail page provided in response to a user selecting an item from an online marketplace.

In various embodiments, the DIB may include one or more different content areas that may be populated with different content elements. A hint may be determined based at least in part on a user search or a user interaction 904. The hint may correspond to a user intent or a user preference for a particular search. For example, the hint may correspond to the item selected by the user for the detail page. Additionally, the hint may correspond to one or more features of the item. Furthermore, the hint may correspond to a theme or grouping of the item, such as a series or a content type. A first area of the DIB may be populated with the hint 906. For example, a content element may be provided to illustrate to the user what information is driving the selection of subsequent content elements within the DIB.

A collection may be determined based on the hint 908, where the collection includes item related to or otherwise associated with the hint. For example, if the hint corresponds to a book series, the collection may be other books within the series. As another example, if the hint corresponds to a video game series, the collection may be other video games within the same series. Furthermore, if the hint corresponds to a particular comic book character, the collection may include comic books that include that character. Accordingly, the hint may be utilized to present relevant content to the user without having the user navigate to a different page. A second area of the DIB is populated with the collection 910. In certain embodiments, the second area is proximate the first area so that both can be viewed simultaneously. However, it should be appreciated that the DIB may be scrollable such that portions of the first or second area may be obscured or removed from view in favor of other content elements.

In various embodiments, the hint is also used to determine other related items 912. For example, the other related items may correspond to items that may pair well with the hint or are otherwise connected. By way of example, if the hint is a series and the collection are books within the series, the related items may correspond to other books by the same author or to other series that the user may find enjoyable. The related items may be presented in a third area of the DIB 914. Accordingly, the user may receive information in an easily identifiable way, where the information provides access to information that would otherwise be uncovered with additional navigational inputs from the user.

FIG. 10 is a flow chart of an example process 1000 for updating a DIB responsive to a user input. As noted above, the DIB may be dynamically adjusted based on a user's navigational intent. That is, the user may select items from a page, such as a detail page, and based on how that selection relates to the hint driving the DIB, the DIB may be dynamically adjusted. In this example, a query is received 1002. The query may correspond to a search query in an online marketplace. Responsive to the query, a list of search results may be provided 1004 and a user may select an item from the list 1006. Responsive to the selection, the user is presented with a detail page 1008, which may include the DIB. As noted above, the DIB includes various different content areas that include a hint area, a collection area, and an add on area. Each of these areas may be populated based at least in part on the user's intent or interactions. For example, the hint for the DIB may correspond to the item the user selected, where the collections are other items having a common characteristic of feature with the hint. Subsequent user interactions may drive changes in the DIB.

In various embodiments, a first user interaction is received 1010. The first user interaction may include a selection of a content element corresponding to a link for a product.

The content element may be within the DIB, such as within the collections area. Responsive to that selection, a new detail page for the item may be provided with the DIB content being maintained 1012. For example, if the collection area includes books in a series and the user selects book 3, the detail page may be updated to show information for book 3, but the DIB may maintain the collection corresponding to other books within the series.

However, in other embodiments, a second user interaction is received 1014. This interaction may include a selection of a content element outside of the DIB. For example, the user may see another product in a "recommended items" section that draws the users attention. Accordingly, a third detail page may be provided to include information for the selected item and the DIB may be updated based on a new hint provided by the selected item 1016. As an example, if the user selects an item outside of the DIB corresponding to a book in a second book series, the new detail page may include information for the selected book while the DIB is updated to include books within the second book series, rather than the previously selected books from the first book series. In this manner, the user may be provided with relevant information based on their current browsing intent.

FIG. 11 is a flow chart of an example process 1100 for updating a region of a DIB based on a user interaction. As noted above, various portions of the DIB may be updated or changed responsive to a user's browsing intent or selections. In this example, a selection is received corresponding to an item for sale in an online marketplace 1102. The selection may be from a list of search results within the online marketplace or from an external source that redirects the user to the online marketplace, among other options. A collection of related items may be determined based on one or more features of the item for sale 1104. As noted above, the features may be extracted using metadata according to categories for how the item is indexed or otherwise organized within the online marketplace. It should be appreciated that other techniques may also be utilized to determine the features, such as various computer vision techniques, user reviews, and the like.

An interface is provided that includes a first region and a second region 1106. The first region may correspond to information about the object, such as a detail page. The second region may include the DIB that includes information corresponding to the user's search intent (e.g., the hint) along with collections and add-on items, among other possible options. The collection of related items is presented within the second region, separate from the first region. For example, a template may be selected that includes graphical elements to visually separate different regions of the interface.

A user may interact with the interface 1108. This interaction may be within the first region or the second region. For example, interactions within the first region may correspond to changing features of the item, such as a content type, color, size, etc. Interactions within the second region may correspond to selecting a different item. The first region may be updated responsive to the interaction 1110. For example, if a new item is selected then the first region is updated to provide information for the new object.

As noted above, the DIB may be dynamically adjusted based on user interactions. Accordingly, the interaction that drove the update of the first region may be evaluated to determine whether the previously presented related items are still related to the newly selected item 1112. If so, the collection previously presented within the DIB may be maintained 1114. If not, the second region is updated with a second collection of items 1116. Accordingly, user actions may be utilized to continuously update the DIB. This may enable the user to see how their browsing is changing recommendations by carrying forward their results in order to provide content within relevant corresponding collections.

Figure 12:
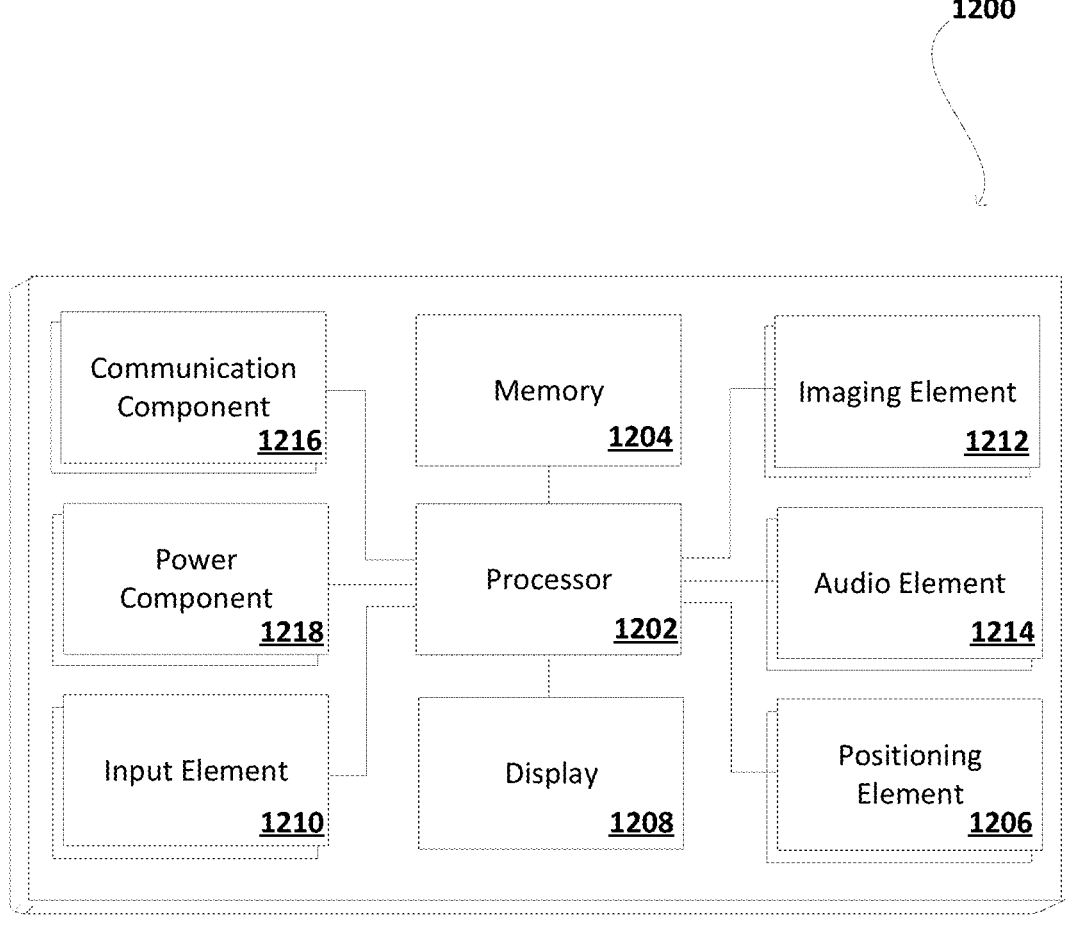
FIG. 12 illustrates example components of a computing device that can be used to implement aspects of the various embodiments.

FIG. 12 illustrates a set of basic components of an electronic computing device 1200 that can be utilized to implement aspects of the various embodiments. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices. The device typically will include some type of display screen 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device.

Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1218 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

receiving a first user interaction corresponding to a selection of a content element from a set of search results;

providing, for the selected content element, a detail page replacing the set of search results, the detail page including content information in a first section and a dynamic ingress bar (DIB) in a second section, wherein the DIB comprises:

a representative content element in a first region, the representative content element associated with a theme of the selected content element;

a display element of the selected content element from the set of search results in a second region; and one or more related content elements determined based, at least in part, on the selected content element, wherein the one or more related content elements form at least a portion of a collection that includes the selected content element, and wherein members of the collection share at least one salient feature;

receiving a second user interaction corresponding to a selection of a related content element within the DIB;

providing, for the selected related content element, a second detail page and the DIB;

determining, based at least in part on the second user interaction, a user intent corresponds to the collection;

maintaining at least a portion of the related content elements and the representative content element in the DIB, based at least in part on the user intent;

receiving a third user interaction corresponding to a DIB update request;

updating the representative content element responsive to the DIB update request;

determining a second salient feature associated with the DIB update request; and updating the collection based, at least in part, on the second salient feature.

2. The computer-implemented method of claim 1, further comprising:

receiving a fourth user interaction corresponding to a selection of a second content element outside the DIB;

providing, for the selected second content element, a third detail page and the DIB;

determining, based at least in part on the fourth user interaction, the user intent does not correspond to the collection; and updating the DIB with a second collection, the second collection corresponding to the selected second content element.

3. The computer-implemented method of claim 1, further comprising:

selecting, for the first region, the theme, the theme corresponding to a feature of the selected content element; and populating the first region with the representative content element.

4. The computer-implemented method of claim 3, further comprising:

selecting for the second region, the collection, based at least in part on the theme; and populating the second region with the display element and the one or more related content elements.

5. The computer-implemented method of claim 1, further comprising:

selecting, for a third region of the DIB, recommended content for the selected content element, the recommended content being different from the collection and different from supplemental content corresponding to a third section of the detail page; and populating the third region with third region content elements corresponding to the recommended content.

6. A computer-implemented method, comprising:

receiving a first user interaction, the first user interaction corresponding to an input identifying a selected content element from a set of search results;

providing a selected content area, replacing the set of search results, including information associated with the selected content element;

determining, based at least in part on the first user interaction, a hint corresponding to a user intent associated with the selected content element;

determining, based at least in part on the user intent, a collection of related content elements having a common theme, the collection of related content elements including at least the selected content element;

providing a first content area of a frame separate from the selected content area, the first content area including a first display element, indicative of the common theme of the collection, corresponding to the hint;

providing a second content area of the frame adjacent to the first content area and distinct from the first content area, the second content area including a selected display element of the selected content element and second display elements corresponding to a subset of the collection;

receiving a second user interaction corresponding to an update request;

updating the first display element responsive to the update request;

determining a salient feature associated with the update request; and updating the collection based, at least in part, on the salient feature.

7. The computer-implemented method of claim 6, further comprising:

determining, based at least in part on the first user interaction, recommended content elements corresponding to the hint; and providing a third content area of the frame, the third content area including a plurality of third content elements corresponding to at least a portion of the recommended content elements, the third content elements being different from the collection of related content elements and different from a plurality of suggested content elements presented in a second frame.

8. The computer-implemented method of claim 6, further comprising:

determining a property of a related content element of the collection, the property corresponding to a relationship between a user and the related content element; and providing a badge indicative of the relationship, the badge being associated with the related content element.

9. The computer-implemented method of claim 8, wherein the relationship corresponds to at least one of an ownership status, a content type status, a current selection, or a chronological indication.

10. The computer-implemented method of claim 6, wherein the first user interaction corresponds to a selection of an item from a list of search results, further comprising:
determining the collection corresponds to at least a portion of the list of search results.

11. The computer-implemented method of claim 6, further comprising:
receiving a third user interaction, the third user interaction corresponding to a selection of a second content element in a second frame, the second frame being distinct from the frame;
determining one or more features of the second content element;
determining, based at least in part on the one or more features, that a second hint corresponding to the second content element is different from the hint; and
selecting a second collection corresponding to the second hint.

12. The computer-implemented method of claim 11, further comprising:
replacing the first display element with an updated first display element, the updated first display element corresponding to the second hint; and
replacing the second display elements with an updated plurality of second display elements, the updated plurality of second display elements corresponding to at least a portion of the second collection.

13. The computer-implemented method of claim 6, further comprising:
receiving a third user interaction, the third user interaction corresponding to a selection of a second display element in the second area; and
maintaining the respective display elements in the first area and the second area.

14. The computer-implemented method of claim 6, further comprising:
selecting, from a template database, a template for presenting the frame responsive to the first user interaction;
providing the template, the template including a first template area, a second template area, and a third template area;
populating the first template area with the frame;
populating the second template area with the selected content area; and
populating the third template area with recommended content.

15. A system, comprising:
at least one processor; and
memory including instructions that, when executed by the at least one processor, cause the system to:
receive a first user interaction, the first user interaction corresponding to an input identifying a selected content element from a set of search results;
provide a selected content area, replacing the set of search results, including the selected content element;
determine, based at least in part on the first user interaction, a hint corresponding to a user intent associated with the selected content element;
determine, based at least in part on the user intent, a collection of related content elements having a common theme, the collection of related content elements including at least the selected content element;
provide a first content area of a frame separate from the selected content area, the first content area including a first display element, indicative of the common theme of the collection, corresponding to the hint;
provide a second content area of the frame adjacent to the first content area and distinct from the first content area, the second content area including a selected display element of the selected content element and second display elements corresponding to a subset of the collection;
receive a second user interaction corresponding to an update request;
update the first display element responsive to the update request;
determine a salient feature associated with the update request; and
update the collection based, at least in part, on the salient feature.

16. The system of claim 15, wherein the instructions when executed further cause the system to:
determine, based at least in part on the first user interaction, recommended content elements corresponding to the hint; and
provide a third content area of the frame, the third content area including a plurality of third content elements corresponding to at least a portion of the recommended content elements, the third content elements being different from the collection of related content elements and different from a plurality of suggested content elements presented in a second frame.

17. The system of claim 15, wherein the first user interaction corresponds to a selection of an item from a list of search results, and the instructions when executed further cause the system to:
determine the collection corresponds to at least a portion of the list of search results.

18. The system of claim 15, wherein the instructions when executed further cause the system to:
receive a third user interaction, the third user interaction corresponding to a selection of a second content element in a second frame, the second frame being distinct from the frame;
determine one or more features of the second content elements;
determine, based at least in part on the one or more features, that a second hint corresponding to the second content element is different from the hint; and
select a second collection corresponding to the second hint.

19. The system of claim 18, wherein the instructions when executed further cause the system to:
replace the first display element with an updated first display element, the updated first display element corresponding to the second hint; and
replace the second display elements with an updated plurality of second display elements, the updated plurality of second display elements corresponding to at least a portion of the second collection.

20. The system of claim 15, wherein the instructions when executed further cause the system to:

receive a third user interaction, the third user interaction corresponding to a selection of a second display element in the second area; and maintain the respective display elements in the first area and the second area.

* * * * *